(12) United States Patent
Roh et al.

(10) Patent No.: US 11,226,675 B2
(45) Date of Patent: Jan. 18, 2022

(54) APPARATUS AND METHOD FOR ADAPTIVELY CONFIGURING USER INTERFACE

(71) Applicant: Samsung Electronics Co., Ltd., Suwon-si (KR)

(72) Inventors: Yeon Hee Roh, Suwon-si (KR); Dong Ho Koo, Suwon-si (KR); Hyeon Ju Lee, Suwon-si (KR); Stephanie Ahn, Suwon-si (KR); Young Hak Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/765,043

(22) PCT Filed: Nov. 5, 2018

(86) PCT No.: PCT/KR2018/013292
§ 371 (c)(1),
(2) Date: May 18, 2020

(87) PCT Pub. No.: WO2019/103350
PCT Pub. Date: May 31, 2019

(65) Prior Publication Data
US 2020/0401213 A1    Dec. 24, 2020

(30) Foreign Application Priority Data

Nov. 22, 2017  (KR) .................. 10-2017-0156157

(51) Int. Cl.
*G06F 3/01*      (2006.01)
*G02B 27/01*     (2006.01)
(Continued)

(52) U.S. Cl.
CPC ............ *G06F 3/011* (2013.01); *G02B 27/017* (2013.01); *G06F 3/04812* (2013.01);
(Continued)

(58) Field of Classification Search
USPC ........................................................ 345/156
See application file for complete search history.

(56) References Cited

U.S. PATENT DOCUMENTS

2006/0166737 A1    7/2006  Bentley
2009/0183125 A1*   7/2009  Magal .................... G06F 3/017
                                                        715/863
(Continued)

FOREIGN PATENT DOCUMENTS

DE   20 2017 104 403 U1   10/2017
JP      2017-120164 A      7/2017
(Continued)

OTHER PUBLICATIONS

"Estimation of height of the person by using arm span and hand length measurements"; Gujarat Medical Journal / Mar. 2015, vol. 70 No. 1.
(Continued)

*Primary Examiner* — Chineyere D Wills-Burns
(74) *Attorney, Agent, or Firm* — Jefferson IP Law, LLP

(57) ABSTRACT

Various embodiments of the present invention provide an apparatus and a method for adaptively configuring a user interface in an electronic device. According to various embodiments, an electronic device may comprise: a memory for storing instructions; a communication interface; and at least one processor connected to the communication interface and the memory, wherein the at least one processor is configured to: receive at least one signal which is transmitted by an external electronic device and is used to determine a user's characteristic related to the electronic device and the
(Continued)

external electronic device, in response to detection of the user's input in the external electronic device; determine a field of view (FOV) for the user on the basis of the at least one signal; and execute the stored instructions in order to display a content for virtual reality (VR) on the basis of the determined FOV.

13 Claims, 19 Drawing Sheets

(51) Int. Cl.
    *G06F 3/0481* (2013.01)
    *G06F 3/0346* (2013.01)
    *G06F 3/038* (2013.01)

(52) U.S. Cl.
    CPC .... *G06F 3/04815* (2013.01); *G02B 2027/014* (2013.01); *G02B 2027/0138* (2013.01)

(56) References Cited

U.S. PATENT DOCUMENTS

| | | | |
|---|---|---|---|
| 2009/0289911 A1* | 11/2009 | Nagai | G06F 3/041 |
| | | | 345/173 |
| 2010/0277470 A1 | 11/2010 | Margolis | |
| 2012/0206452 A1 | 8/2012 | Geisner et al. | |
| 2012/0231853 A1 | 9/2012 | Takahashi et al. | |
| 2013/0290106 A1 | 10/2013 | Bradley et al. | |
| 2013/0328927 A1 | 12/2013 | Mount et al. | |
| 2015/0070274 A1 | 3/2015 | Morozov | |
| 2015/0094142 A1* | 4/2015 | Stafford | G06F 3/017 |
| | | | 463/31 |
| 2015/0370329 A1* | 12/2015 | Koyama | B60K 35/00 |
| | | | 345/173 |
| 2015/0375039 A1 | 12/2015 | Park | |
| 2016/0170603 A1* | 6/2016 | Bastien | G06F 3/005 |
| | | | 348/49 |
| 2016/0375364 A1 | 12/2016 | Mikhailov | |
| 2017/0228036 A1 | 8/2017 | Klein et al. | |
| 2017/0228921 A1* | 8/2017 | Buhlmann | G06T 19/006 |
| 2017/0309079 A1 | 10/2017 | Naples et al. | |
| 2017/0329419 A1 | 11/2017 | Dearman et al. | |
| 2017/0336882 A1* | 11/2017 | Tome | G06F 3/0346 |
| 2017/0358141 A1* | 12/2017 | Stafford | A63F 13/537 |
| 2018/0024623 A1* | 1/2018 | Faaborg | G06F 3/04815 |
| | | | 345/156 |
| 2018/0101986 A1* | 4/2018 | Burns | G06F 3/0346 |
| 2018/0173407 A1* | 6/2018 | Kim | G06F 3/04845 |

FOREIGN PATENT DOCUMENTS

| | | |
|---|---|---|
| KR | 10-2007-0095407 A | 9/2007 |
| KR | 10-2012-0020106 A1 | 3/2012 |
| KR | 10-1545654 B1 | 8/2015 |

OTHER PUBLICATIONS

"Arm length measurement as an alternative to height in nutritional assessment of the elderly"; Jun. 1982, vol. 3.
"Predicting height from arm measurements"; Journal of Pediatric Orthopaedics 13:761-765 © 1993 Raven Press, Ltd., New York.
European Search Report dated Dec. 2, 2020, issued in European Application No. 18881377.8.

* cited by examiner

1301

Please hold a controller in your left hand and extend your left hand forwards. Then, please turn your wrist counterclockwise, and then press a trigger button.

1303

Please turn your wrist clockwise, and then press a trigger button.

1307

1305

The measurement has been completed. An input area of the controller is being adjusted...

APPARATUS AND METHOD FOR ADAPTIVELY CONFIGURING USER INTERFACE

TECHNICAL FIELD

Various embodiments relate to an electronic device and a method for adaptively configuring a user interface.

BACKGROUND ART

With the progress of technology for electronic devices, an electronic device may provide various User Experiences (UXs). For example, the electronic device may provide a content for a virtual world, that is, Virtual Reality (VR), which is similar to the reality but is not real. The electronic device may provide VR, and thus may provide rich experience to a user.

DISCLOSURE OF INVENTION

Technical Problem

A user who receives a content for VR may have a Field of View (FOV) which is different from another's due to physical characteristics of the users. The user, who views a content for VR by using an electronic device which displays a content for VR in a fixed configuration or arrangement, may be inconvenienced due to a difference of a FOV caused by the user's physical characteristic. Therefore, there may be a need for a method for providing a content for VR in a configuration adaptively changed according to the user's physical characteristic.

Various embodiments may provide an electronic device and a method for displaying a content for VR in a configuration adaptively changed based on information representing a user's physical characteristic.

The technical subjects pursued in the disclosure may not be limited to the above mentioned technical subjects, and other technical subjects which are not mentioned may be clearly understood, through the following descriptions, by those skilled in the art to which the disclosure pertains.

Solution to Problem

In accordance with an aspect of the disclosure, an electronic device may include: a memory configured to store instructions; a communication interface; and at least one processor configured to be connected to the communication interface and the memory, wherein the at least one processor is configured to: receive at least one signal, which is transmitted by an external electronic device and is used to determine a user's characteristic related to the electronic device and the external electronic device, in response to detection of a user input in the external electronic device; determine a Field of View (FOV) for the user based on the at least one signal; and execute the stored instructions in order to display a content for Virtual Reality (VR) based on the determined FOV.

In accordance with another aspect of the disclosure, a method of an electronic device may include: receiving at least one signal, which is transmitted by an external electronic device and is used to determine a user's characteristic related to the electronic device and the external electronic device, in response to detection of a user input in the external electronic device; determining a Field of View (FOV) for the user based on the at least one signal; and displaying a content for Virtual Reality (VR) based on the determined FOV.

In accordance with still another aspect of the disclosure, a non-transitory computer-readable storage medium may include: receiving at least one signal, which is transmitted by an external electronic device and is used to determine a user's characteristic related to the electronic device and the external electronic device, in response to detection of a user input in the external electronic device; determining a Field of View (FOV) for the user based on the at least one signal; and displaying a content for Virtual Reality (VR) based on the determined FOV.

Advantageous Effects of Invention

According to an electronic device and an operating method thereof according to various embodiments, the electronic device may identify a user's characteristic based on at least one signal received from another electronic device, and thus can provide a user interface optimized for the user.

Effects obtainable from the disclosure may not be limited to the above mentioned effects, and other effects which are not mentioned may be clearly understood, through the following descriptions, by those skilled in the art to which the disclosure pertains.

BEST MODE FOR CARRYING OUT THE INVENTION

Figure 1:
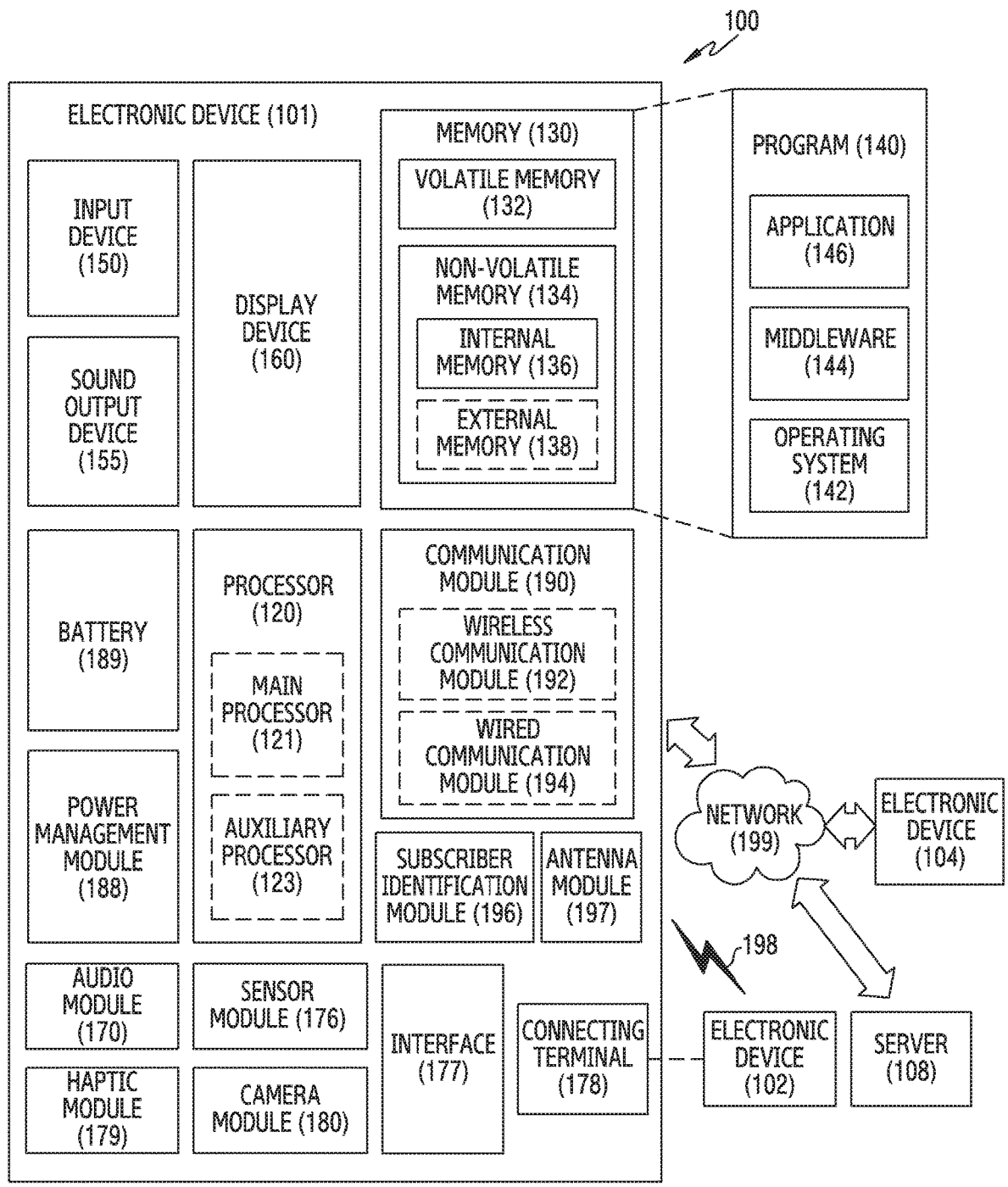
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
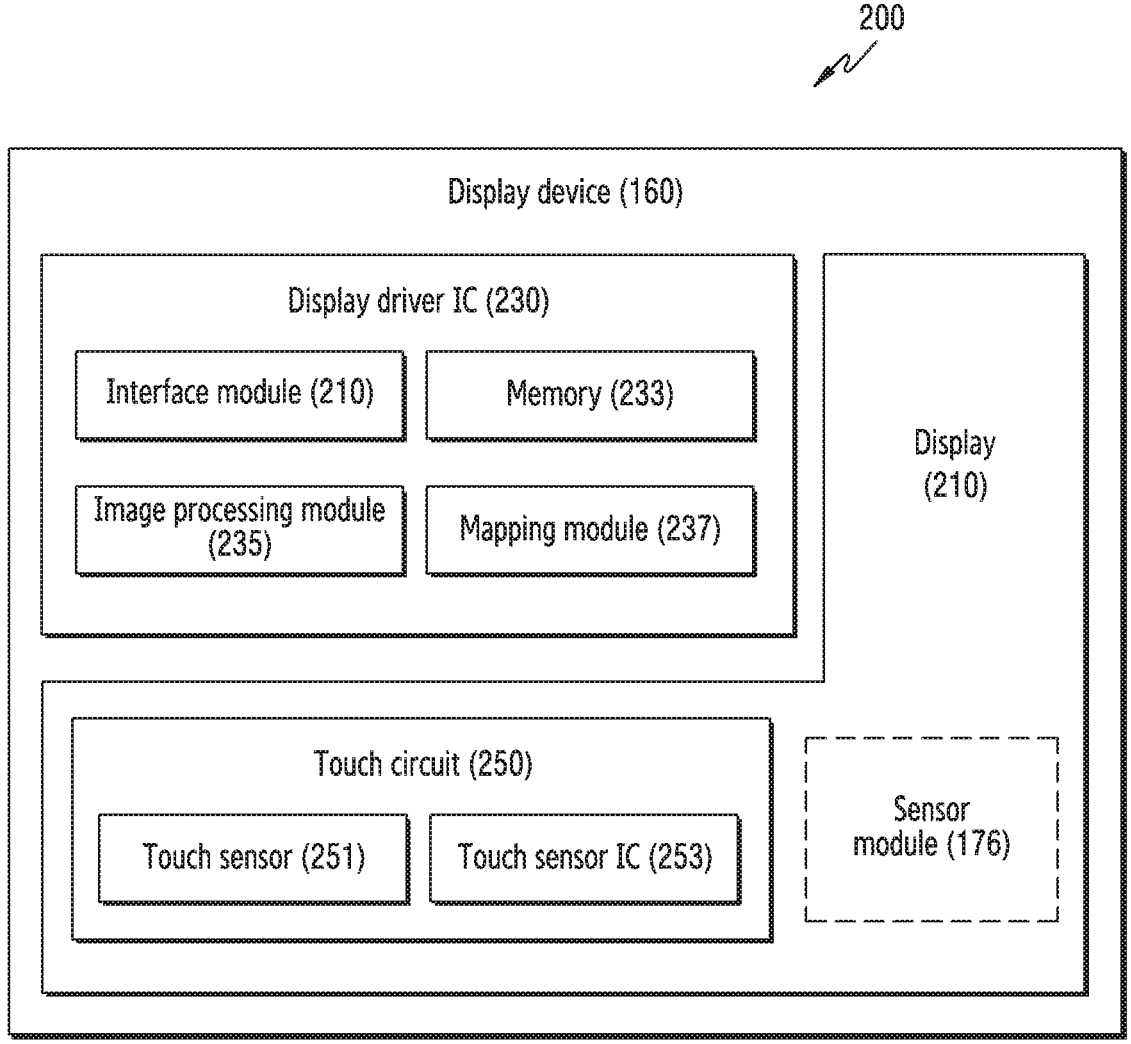
FIG. 2 is a block diagram of a display module according to various embodiments.

FIG. 2 is a block diagram 200 of a display device 160 according to various embodiments. Referring to FIG. 2, the display device 160 may include a display 210 and a Display Driver IC (DDI) 230 configured to control the display 210. The DDI 230 may include an interface module 231, a memory 233 (e.g., a buffer memory), an image processing module 235, or a mapping module 237. The DDI 230 may receive, for example, image data or image information, which includes an image control signal corresponding to a command for controlling the image data, from the processor 120 (e.g., a main processor 121, i.e., an application processor) or an auxiliary processor 123, operated independently of a function of the main processor 121, via the interface module 231. The DDI 230 may communicate with a touch circuit 250, a sensor module 176, or the like via the interface module 231. Further, the DDI 230 may store at least a part of the received image information in the memory 233, for example, on a frame-by-frame basis. The image processing module 235, for example, may perform pre-processing or post-processing (e.g., resolution, brightness, or size adjustment) of at least a part of the image data at least based on a characteristic of the image data or a characteristic of the display 210. The mapping module 237 may convert the image data, pre-processed or post-processed by the image processing module 135, into a voltage value or a current value, which can be used to drive pixels of the display 210, at least in part based on an attribute of the pixels (e.g., arrangement of the pixels (RGB stripe or pentile) or respective sizes of sub-pixels). At least some pixels of the display 210 may be driven based on, for example, the voltage value or the current value, and thus visual information (e.g., text, images, or icons) corresponding to the image data may be displayed on the display 210.

According to an embodiment, the display device 160 may further include the touch circuit 250. The touch circuit 250 may include a touch sensor 251 and a touch sensor IC 253 configured to control the touch sensor 251. The touch sensor IC 253 may control the touch sensor 251 to measure, for example, a change in a signal (e.g., voltage, light quantity, resistance, or charge quantity) at a particular position of the display 210, so as to detect a touch input or a hovering input at the particular position, thereby providing the processor 120 with information on the detected touch input or hovering input (e.g., a position, the area, a pressure, or time). According to an embodiment, at least a part (e.g., the touch sensor IC 253) of the touch circuit 250 may be included as a part of the display driver IC 230 or the display 210, or as a part of another element (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176, or a control circuit configured to control the at least one sensor. In this example, the at least one sensor or the control circuit configured to control the at least one sensor may be implemented to be embedded in a part (e.g., the display 210 or the DDI 230) of the display device 160 or a part of the touch circuit 250. For example, when the sensor module 176 embedded in the display device 160 includes a biometric sensor (e.g., a fingerprint sensor), the biometric sensor may acquire biometric information (e.g., a fingerprint image) related to a touch input via a partial area of the display 210. As another example, when the sensor module 176 embedded in the display device 160 includes a pressure sensor, the pressure sensor may acquire pressure information on a touch input via a partial or entire area of the display 210. According to an embodiment, the touch sensor 251 or the sensor module 176 may be disposed between pixels of a pixel layer of the display 210, or may be disposed above or under the pixel layer thereof.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The term " . . . module" or the like as used hereinafter may refer to a unit for processing at least one function or operation, and the " . . . module" may be implemented in hardware, software, or a combination of hardware and software. This term is used as an example for convenience of description. Therefore, the disclosure is not limited to the terms described below, and other terms having equivalent technical meanings may be used.

Figure 3:
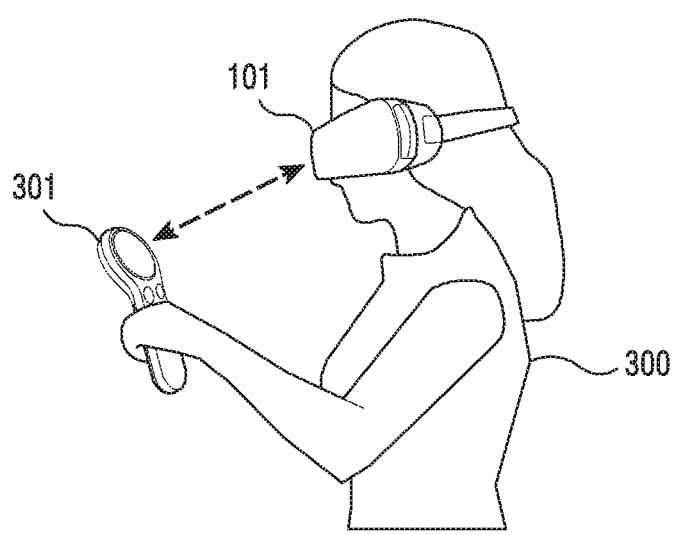
FIG. 3 illustrates an example of use of an electronic device and a controller according to various embodiments.

FIG. 3 illustrates an example of use of an electronic device and a controller according to various embodiments.

Referring to FIG. 3, in various embodiments, the electronic device 101 may be a Head-Mounted Device (HMD). In some embodiments, the electronic device 101 may be a device which can be coupled with the HMD in such a manner as to be inserted and fixed in the HMD. Examples of devices which can be coupled with the HMD may include, smart phones, portable terminals, tablet PCs, or the like.

In various embodiments, the electronic device 101 may be worn in such a manner as to be fixed on a head of a user 300 by using a wearing part (e.g., a headgear, a hair band, or frames for glasses). Although not illustrated, the electronic device 101 may be worn in such a manner that the user 300 holds, in person, the electronic device 101 and puts the same near the user's face.

In various embodiments, the electronic device 101 may provide the user 300 with an experience of VR. For example, the electronic device 101 may display a content for VR on the display 210, and thus may provide a user experience of a three-Dimensional (3D) environment to the user 300 who views the display 210.

In various embodiments, in order to enhance the usability of the electronic device 101, the electronic device 101 may be connected wirelessly or by wire to the controller 301. Although not illustrated, according to an embodiment, the controller 301 may be configured to be a single device or multiple devices.

The controller 301 connected to the electronic device 101 may be placed at a position near the user's body part (e.g., a hand), or may be used to control a content for VR provided by the electronic device in a state in which the controller 301 is held in the user's hand.

In various embodiments, the controller 301 may be an input apparatus configured to receive a user input for selection of an object displayed on a UI of the electronic device 101. The controller 301 may include a physical button or a touch pad. The controller 301 may transmit a signal representing a user input to the electronic device 101 in response to detection of an input received via the physical button or the touch pad.

Figure 4:
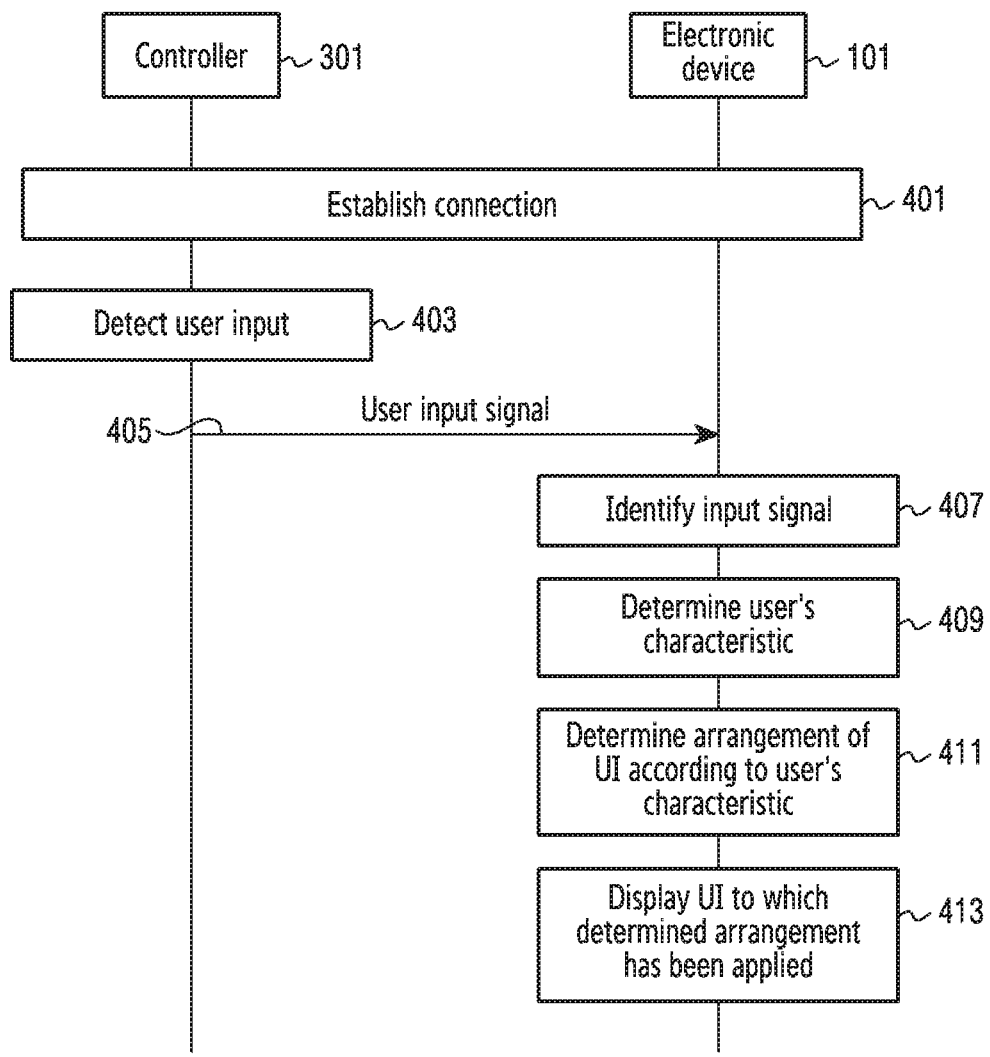
FIG. 4 illustrates an example of a signal flow of an electronic device for optimizing a User Interface (UI) according to various embodiments.

FIG. 4 illustrates an example of a signal flow of an electronic device for optimizing a UI according to various embodiments.

Referring to FIG. 4, in operation 401, the electronic device 101 may be connected to the controller 301. In various embodiments, the electronic device 101 may be connected to the controller 301 according to various schemes. In some embodiments, according to execution of a particular application, the electronic device 101 may search for whether there is a connectable controller around the electronic device 101. If the electronic device 101 finds the connectable controller 301, the electronic device 101 may establish a connection to the controller 301. In some other embodiments, the electronic device 101 may receive an input for triggering a search for a controller, from a user (e.g., the user 300) based on execution of a particular application. In response to reception of the input, the electronic device 101 may search for the controller 301, and may establish a connection to the searched controller 301. An operation of establishing a connection to the controller 301 is not limited to the above-described example.

In various embodiments, according to establishment of the connection between the electronic device 101 and the controller 301, the electronic device 101 may perform an operation of registering the controller 301 in the electronic device 101. This operation may be referred to as an "Out-Of-Box Experience (OOBE)". In an OOBE procedure operation, in order to provide a UI adaptive to the user, the electronic device 101 may request the user to enter an input to the controller 301.

In operation 403, the controller 301 may detect a user input. In various embodiments, the electronic device 101 may display text and the like in a UI on the display of the electronic device 101, and thus may guide a user input. For example, the electronic device 101 may display the text "Please press a trigger button on your shoulder." in a UI, and thus may guide a user input. The term "trigger button" may refer to one physical button included in the controller 301. As another example, the electronic device 101 may display a reference point in a UI, may display the text "Please point at the reference point, and then press a trigger button.", and thus may guide a user input. As still another example, the electronic device 101 may display the text "Please hold the controller in your left hand, and then turn your left wrist by one revolution.", and thus may guide a user input. The controller 301 may detect a user input according to guidance displayed in a UI of the electronic device 101.

In various embodiments, a user input may include a click on the controller 301, a double click thereon, a long press thereon, a drag thereon, shaking thereof, or the like. Examples of the user input may include various types of inputs related to the controller 301, but the disclosure is not limited to the above-described examples.

In operation 405, the controller 301 may transmit a signal representing a user input (hereinafter, "user input signal") to the electronic device 101. The controller 301 may transmit a user input signal to the electronic device 101 in response to detection of the user input.

In various embodiments, the controller 301 may transmit a user input signal to the electronic device 101 in response to detection of a user input. The user input may include an input via a physical button (e.g., a trigger button) or a touch pad included in the controller 301. Information on an input may be identified by at least one sensor (e.g., an acceleration sensor, an angular velocity sensor, a gyro sensor, or a GPS sensor) included in the controller 301. The controller 301 may transmit various pieces of information related to a user input to the electronic device 101 via an input signal. For example, the controller 301 may transmit, to the electronic device 101, information on a position at which a user input is received, a movement distance of the controller 301 until reception of the user input, and the like.

In operation 407, the electronic device 101 may identify an input signal received from the controller 301. The input signal may include information representing a user input, or a sensor value of the user input. The electronic device 101 may identify information represented by the input signal received from the controller 301. In an embodiment, the electronic device 101 may identify information on the input signal received from the controller 301 based on at least one sensor included in the electronic device 101. In this example, the electronic device 101 may track the controller 301 (or motion of the controller 301 or movement of the controller 301) via the sensor included in the electronic device 101. The electronic device 101 may identify the input signal based on a sensor value, which is based on the at least one sensor included in the electronic device 101, and the information included in the input signal of the controller.

In various embodiments, the electronic device 101 may associate the information included in the input signal received from the controller 301 with a content being displayed in a UI, and thus may identify what the received signal represents. For example, the electronic device 101 may receive an input signal from the controller 301 while a UI including the text "Please press a trigger button on your shoulder." is displayed. In this example, the electronic device 101 may identify that the received input signal is a signal representing a position of the user's shoulder.

In various embodiments, in relation to identifying of an input signal of the controller 301, the electronic device 101 may identify information on a position or movement of the controller 301 included in the input signal of the controller 301. In some embodiments, the electronic device 101 may identify information on a position or movement of the controller 301 via a sensor included in the electronic device 101. The sensor included in the electronic device 101 may be, for example, a sensor capable of tracking movement of the controller 301. In some other embodiments, the electronic device 101 may identify an input signal based on mutual information exchange between a sensor included in the electronic device 101 and a sensor included in the controller 301. In relation to the operation of identifying an input signal of the controller 301, it is possible to utilize various sensors configured to identify a position of the controller 301, a movement range thereof, a movement distance thereof, a movement speed thereof, or the like, and the disclosure is not limited to the above-described example.

In various embodiments, the process of operation 403 to operation 407 may be repeated. For example, the electronic device 101 may display another UI including text requesting an input of a position to which the user's arm is extended, based on identifying of a signal representing a position of the user's shoulder. The controller 301 may detect a user input based on another displayed UI, and thus may transmit a signal representing the input to the electronic device 101. The electronic device 101 may identify the received signal, and thus may determine a position to which the user's arm is extended.

In operation 409, the electronic device 101 may determine the user's characteristic. The electronic device 101 may determine the user's characteristic based on identifying of the input signal. The user's characteristic may include the user's physical characteristic. For example, the user's characteristic may include the user's height, the user's arm span, a movable range of the user's wrist, or a distance in a case where the user's arm can be maximally extended. Information on the user is not limited to the above-described example, and may include various pieces of information on the user related to use of the electronic device 101.

In various embodiments, the electronic device 101 may determine a user's characteristic based on a database. The database may be stored in the form of Table 1 below.

TABLE 1

| Shoulder position | Position to which arm is extended | User's characteristic (user's height) |
|---|---|---|
| (0, 0) | (70, 0) | 130 cm |
|  | (80, 0) | 145 cm |
|  | (90, 0) | 160 cm |
|  | (100, 0) | 175 cm |
|  | (110, 0) | 190 cm |
| (10, 0) | (70, 0) | 120 cm |
|  | (80, 0) | 135 cm |
|  | (90, 0) | 150 cm |
|  | (100, 0) | 165 cm |
|  | (110, 0) | 180 cm |

Referring to Table 1, the database may include information on a user's characteristic corresponding to an identified input signal. For example, the electronic device 101 may acquire information on the user's height, from the database based on a signal representing a position of the user's shoulder and a signal representing a position to which the user's arm is extended. Table 1 is only an example of a part of a database related to a user's height, and the disclosure is not limited to the above-described example.

In various embodiments, the electronic device 101 may determine a user's characteristic based on a mathematical formula. Information on a mathematical formula may be pre-stored in the electronic device 101. The electronic device 101 may determine a user's characteristic based on information on a mathematical formula included in Table 1 below and information on an input signal.

TABLE 2

| Gender | Arm position | Mathematical formula | |
|---|---|---|---|
| male | right arm | mathematical formula 1 | HT = 54.313 + (0.605)*A + (0.731)*H |
|  | left arm | mathematical formula 2 | HT = 54.399 + (0.606)*A + (0.741)*H |
| female | right arm | mathematical formula 3 | HT = 40.528 + (0.737)*A + (0.056)*H |
|  | left arm | mathematical formula 4 | HT = 40.553 + (0.739)*A + (0.037)*H |

In Table 1, HT may represent a user's height, A may represent a user's arm span, and H may represent a user's hand size. In various embodiments, the electronic device 101 may identify a position of a user's shoulder and a position to which the user's arm is extended, based on a signal representing the position of the user's shoulder and a signal representing the position to which the user's arm is extended. The electronic device 101 may determine a distance from the position of the shoulder to the position to which the arm is extended, and thus may identify the user's arm span. In some embodiments, the electronic device 101 may designate a particular value (e.g., 15 cm) for H, that is, the user's hand size, in each of the mathematical formulas (mathematical formula 1 to mathematical formula 4) in Table 1. In this example, the electronic device 101 may determine the user's height by using the mathematical formulas based on identifying of the user's arm span. In the specification, an example of a mathematical formula for calculation of a user's height is described, but without being limited thereto, various mathematical formulas or algorithms for determination of a user's characteristic may be used.

In operation 411, the electronic device 101 may determine an arrangement (or a configuration) of a UI corresponding to the user's characteristic. Information on the arrangement of a UI may be mapped to the user's characteristic so as to be stored in the electronic device 101. The electronic device 101 may determine an arrangement of a UI based on identifying of the stored information.

In various embodiments, the electronic device 101 may include at least one UI arrangement mode having different arrangement forms. The UI arrangement modes may be mapped to respective characteristics of users. The electronic device 101 may determine a UI arrangement mode mapped to the user's characteristic determined in operation 409. For example, when the user's height is less than or equal to 150 cm, the electronic device 101 may determine that a UI arrangement mode is a first mode. When the user's height exceeds 150 cm and is less than or equal to 180 cm, the electronic device 101 may determine that a UI arrangement mode is a second mode. When the user's height exceeds 180 cm, the electronic device 101 may determine that a UI arrangement mode is a third mode.

In various embodiments, information on arrangement of a UI may include, for example, information on a range in which a UI is displayed on a display, information on arrangement of at least one object included in a UI, or information on the size of at least one object included in a UI.

In operation 413, the electronic device 101 may display a UI to which the determined arrangement has been applied. In some embodiments, the electronic device 101 may store information on the determined arrangement in an OOBE mode, and thus may determine a basic arrangement of a UI of the electronic device 101. The electronic device 101 may display a UI based on the determined arrangement. In some other embodiments, when an arrangement of a UI is pre-stored in the electronic device 101, the electronic device 101 may adjust display (or FOV) of a UI based on the determined arrangement. The electronic device 101 may display a UI so as to provide a FOV optimized for each user.

Figure 5:
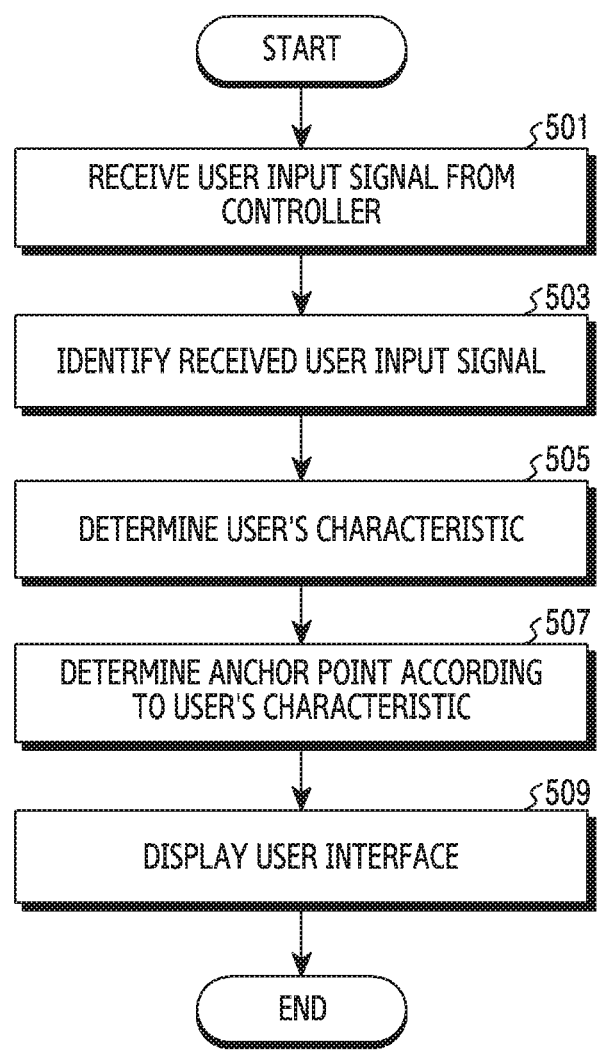
FIG. 5 illustrates an example of an operation of an electronic device for optimizing a UI according to various embodiments.

FIG. 5 illustrates an example of an operation of an electronic device for optimizing a UI according to various embodiments. In various embodiments, operation 501 to operation 505 may correspond to operation 405 to operation 409 of FIG. 4, respectively. A description of operations identical or similar to the operations described with reference to FIG. 4 will be omitted.

Referring to FIG. 5, in operation 501, the electronic device 101 may receive an input signal of a user (e.g., the user 300) (or a user input signal) from the controller 301. In various embodiments, the electronic device 101 may display a UI configured to guide a user input. The UI configured to guide a user input may include, for example, the text "Please press a trigger button of the controller 301 at the position of your shoulder." The controller 301 may detect a user input in a state in which the user responds to guidance included in the displayed UI. In response to reception of the user input, the controller 301 may transmit, to the electronic device, a signal representing the user input (or information on the user input).

In various embodiments, the controller 301 may include multiple controllers. For example, the controller 301 may include a left-hand controller and a right-hand controller. The user may press buttons included in the multiple controllers in a state in which the user holds the multiple controllers in both hands, respectively. In this example, each of the multiple controllers may transmit, to the electronic device 101, a signal representing an input via a physical button detected by each of the multiple controllers. The electronic device 101 may receive, from the controller 301, a signal representing an input. The electronic device 101 may receive a user input signal from each of the multiple controllers.

In operation 503, the electronic device 101 may identify the received user input signal. The electronic device 101 may identify information represented by the received user input signal. For example, the electronic device 101 may identify whether the received user input signal is a signal representing a position of the user's shoulder or a signal representing a position to which the user's arm is extended. This identification may be performed based on at least one sensor (e.g., an acceleration sensor, an angular velocity sensor, a gyro sensor, or a GPS sensor) included in the electronic device 101 or the controller 301.

In various embodiments, when there are multiple user input signals, the electronic device 101 may identify each of the multiple user input signals, and thus may identify information represented by each of the multiple user input signals. For example, the electronic device 101 may receive multiple signals representing positions, to which both arms are extended, via the multiple controllers. The electronic device 101 may identify the multiple signals, and thus may identify the multiple signals representing a position to which the left arm is extended and a position to which the right arm is extended.

In various embodiments, operation 501 and operation 503 may be repeated. In some embodiments, operation 501 and operation 503 may be repeated based on display of a UI. For example, when a UI related to a position of the user's shoulder is initially displayed, operation 501 and operation 503 may be performed. Then, when a UI related to a position, to which the user's arm is extended, is displayed, operation 501 and operation 503 may be repeated again.

In operation 505, the electronic device 101 may determine the user's characteristic. The electronic device 101 may determine the user's characteristic based on the user input signal. For example, when the user input signals are a signal representing a position to which the user's left arm is extended and a signal representing a position to which the user's right arm is extended, the electronic device 101 may determine the user's arm spans. The electronic device 101 may substitute the determined arm spans into the pre-stored mathematical formulas, and thus may determine the user's height.

In operation 507, the electronic device 101 may determine an anchor point according to the user's characteristic. The electronic device 101 may determine an anchor point of the controller 301 or an anchor point for display of a UI of the electronic device 101, according to the user's characteristic. An anchor point may include a central axis for display of a UI. The electronic device 101 may determine a reference point for display of a UI, based on the anchor point. The electronic device 101 may display or adjust a UI with reference to the determined reference point. In some embodiments, when there is a predesignated anchor point, the electronic device 101 may adjust (or change) a position of the anchor point according to the determined user's height. In some other embodiments, the electronic device 101 may configure a reference position of an anchor point, according to the determined user's height. When displaying a UI, the electronic device 101 may arrange the UI or objects included in the UI with reference to the anchor point. The electronic device 101 may move the anchor point in the z-axis direction, and thus may adjust the UI (or display of the UI).

In various embodiments, an anchor point may be changed based on the user's height. For example, the electronic device 101 may change an anchor point in a direction further away from or nearer to a UI on the z-axis. In some embodiments, the electronic device 101 may include a default height. When the user's height is greater than the default height, the electronic device 101 may adjust (or change) a position of an anchor point so that the anchor point can be further away from a UI. In some other embodiments, when the user's height is less than the default height, the electronic device 101 may adjust an anchor point in a direction nearer to a UI.

In various embodiments, an adjustment distance of an anchor point may be determined according to a ratio of a default height to a user's height. For example, when a default height is 1 m and a reference anchor point has a position of 1 on the z-axis, in response to a user's height of 1.8 m, the electronic device 101 may adjust a position of an anchor point so that the anchor point can have a position of 1.8. In this example, a direction further away from a UI may be configured as a positive direction (a plus direction) on the z-axis.

In various embodiments, in order to adjust an anchor point, the electronic device 101 may pre-store anchor point values corresponding to respective heights in a database. In this example, the electronic device 101 may determine an anchor point based on determination of a user's height. The electronic device 101 may use various schemes to determine an anchor point, and the disclosure is not limited to the above-described example.

In operation 509, the electronic device 101 may display a UI. The electronic device 101 may adjust (or adjust and display) the UI with reference to the determined anchor point. For example, when an anchor point of a UI is changed, the electronic device 101 may change (or change and display) an arrangement of a UI with reference to the changed anchor point. The electronic device 101 may change the arrangement of the UI, and thus may adjust display (or FOV) of the UI according to the user's height. The electronic device 101 may adjust a UI for each user, and thus may provide a UI optimized for a user. The electronic device 101 may efficiently control a UI based on the anchor point.

In various embodiments, the electronic device 101 may change an anchor point, configured to display an object representing an input via the controller 301, on a UI of the electronic device 101. The electronic device 101 may change the anchor point, and thus may configure, for each user, manipulation of an input via the controller 301.

Figure 6:
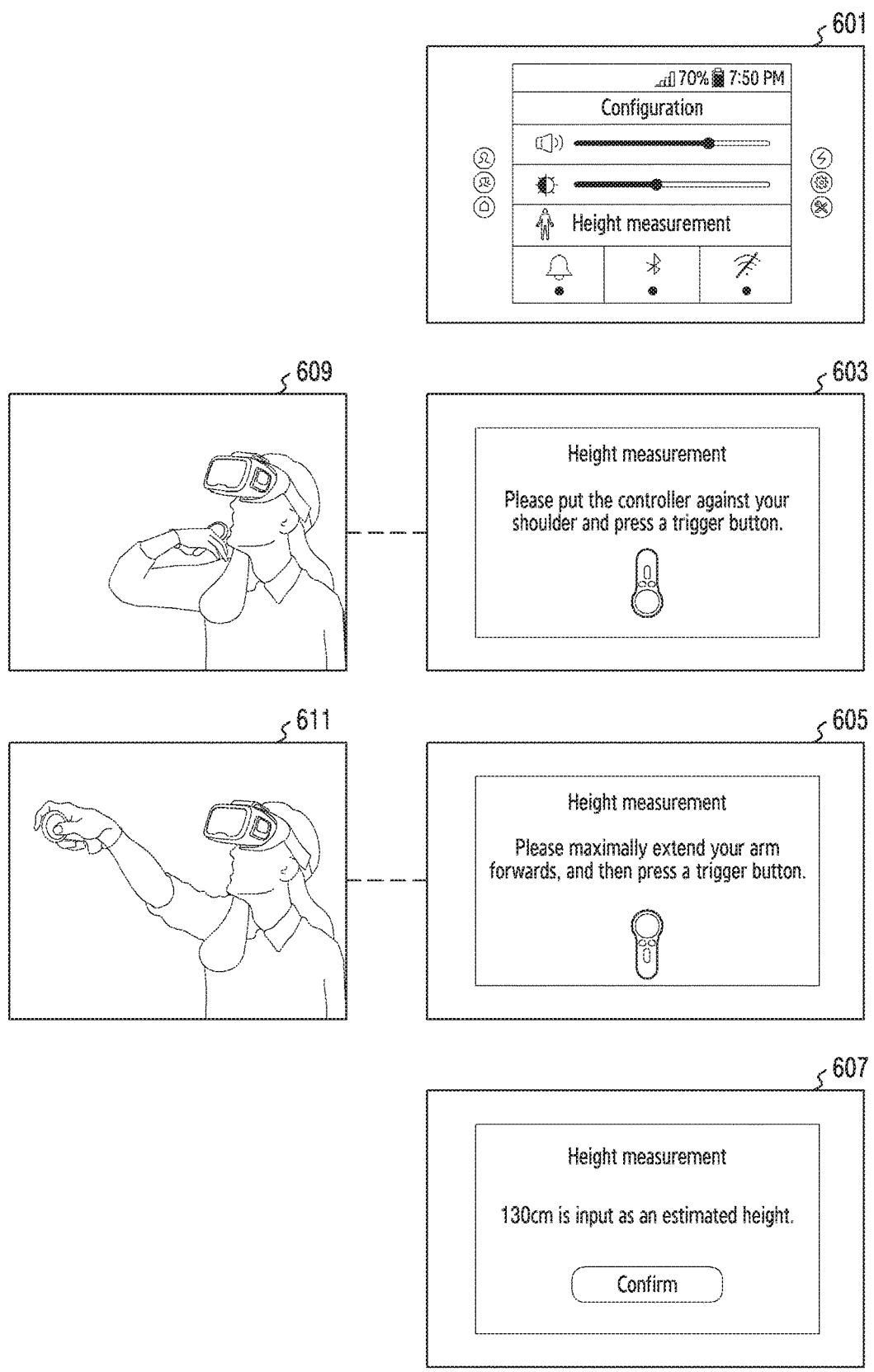
FIG. 6 illustrates an example of a UI configured to determine a user's characteristic according to various embodiments.

FIG. 6 illustrates an example of a UI configured to determine a user's characteristic according to various embodiments. In various embodiments, FIG. 6 illustrates an example in which there is one controller 301 connected to the electronic device 101.

A UI 601 may be an initial execution screen (or an OOBE screen or a configured screen) of the electronic device 101. At the time of initial execution, the electronic device 101 may display the UI 601, and thus may configure initial values. The electronic device 101 may display the UI 601 in a state of being connected to the controller 301. The electronic device 101 may detect an input of a height measurement item included in a UI via the controller 301.

In various embodiments, the UI 601 may be displayed for initial configuration. At the time of initial execution, the electronic device 101 may display the UI 701, and thus may configure pieces of initial information (e.g., input of a user account, configuration of a user background, configuration of brightness of a UI, and configuration of a user environment) for operation of the electronic device 101. In some embodiments, the UI 601 may be displayed based on initiation of an application (e.g., a configuration application) for configuration of the electronic device 101. In some other embodiments, the UI 601 may be displayed in response to boot-up of the electronic device 101.

In various embodiments, the electronic device 101 may display a UI 603 based on detection of an input of a height measurement item. The UI 603 may guide manipulation of the controller 301 by the user. For example, the UI 603 may include the text "Please put the controller against your shoulder and press a trigger button." The controller 301 may detect a user input via a trigger button in a state of being held by the user.

In various embodiments, the electronic device 101 may receive at least one of information on a user input of pressing the trigger button or a sensor value related to a user input, from the controller 301 while displaying the UI 603 (or after displaying the UI 603). The electronic device 101 may identify a position of the user's shoulder based on the at least one of the information on the user input or the sensor value related to the user input.

In various embodiments, the electronic device 101 may display a UI 605 in response to reception of the user input. The UI 605 may be used to guide a subsequent action required to determine the user's characteristic (e.g., the user's physical characteristic). The subsequent action may include, for example, the user's action of pressing a physical button of the controller 301 at the position of the user's shoulder, or the user's action of pressing a physical button of the controller 301 in a state in which the user's arm is extended. For example, the UI 605 may include the text "Please maximally extend your arm forwards, and then press a trigger button." According to display of the UI 605, as in a user action 611, the user may perform an action of pressing a button (e.g., a trigger button) included in the controller 301 in a state in which the user holds the controller in the user's hand and extends the user's arm.

In various embodiments, the electronic device 101 may receive a user input of pressing a trigger button from the controller 301 while displaying the UI 605 (or after displaying the UI 605). The electronic device 101 may identify a position to which the user's arm is extended, based on reception of the user input.

In various embodiments, the UI 603 or the UI 605 may be displayed regardless of the order thereof. For example, after the UI 605 is displayed, the UI 603 may be displayed based on reception of an input related to the UI 605.

In various embodiments, the electronic device 101 may determine the user's arm span based on a position of the user's shoulder and a position to which the user's arm is extended. For example, the electronic device 101 may identify a distance between a position of the user's shoulder and a position to which the user's arm is extended, and thus may determine the user's arm span. The electronic device 101 may determine the user's height by using the determined user's arm span. In order to determine the user's height, the electronic device 101 may use a mathematical formula (e.g., mathematical formula 1 to mathematical formula 4 included in Table 1) or may use pre-stored information. Various schemes may be used to determine the user's height, and the disclosure is not limited to the above-described example.

In various embodiments, the electronic device 101 may store information on the user's height as information for display of a UI, based on determination of the user's height. The electronic device 101 may determine a form of display of a UI of the electronic device 101, an arrangement of a UI, or an object included in a UI, based on the information on the user's height. For example, the electronic device 101 may adjust an anchor point based on the information on the user's height. The electronic device 101 may apply the adjusted anchor point, and thus may change display of a UI so as to be optimized for the user.

The electronic device 101 may display a UI 607 based on storage of the information on the user's height. The UI 607 may include text representing the information on the user's height. For example, the UI 607 may include the text "130 cm is input as an estimated height." A height measurement operation according to the first configuration of the electronic device 101 may be terminated based on display of the UI 607. The electronic device 101 may terminate the first configuration for display of a UI. According to an embodiment, the electronic device 101 may display the UI 601 based on reception of a user input for configuration, and in this example, the operations of FIG. 6 may be performed repeatedly.

The UI 603 to the UI 607 may include various texts for guiding the actions of measuring the user's height, and the disclosure is not limited to the above-described example.

Figure 7:
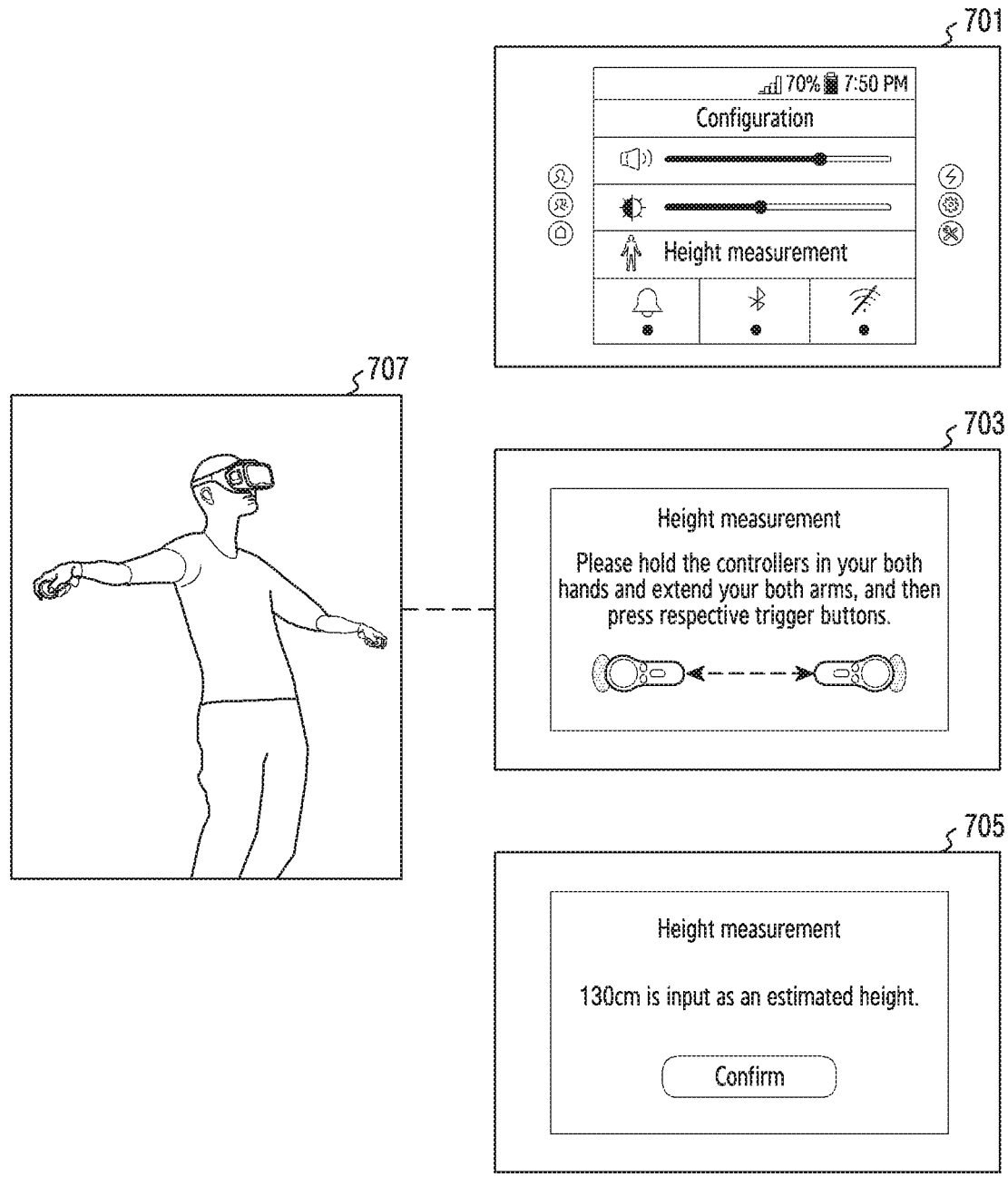
FIG. 7 illustrates another example of a UI configured to determine a user's characteristic according to various embodiments.

FIG. 7 illustrates another example of a UI configured to determine a user's characteristic according to various embodiments. In various embodiments, FIG. 7 illustrates an example in which there are multiple controllers (e.g., two controllers) connected to the electronic device 101. The multiple controllers may all have the same configuration.

A UI 701 is illustrated as an example of an initial configuration screen (or an OOBE screen) of the electronic device 101. At the time of initial execution, the electronic device 101 may display the UI 701, and thus may configure pieces of initial information (e.g., input of a user account, configuration of a user background, configuration of brightness of a UI, and configuration of a user environment) for operation of the electronic device 101. The electronic device 101 may display the UI 701 in a state of being connected to the multiple controllers. The electronic device 101 may detect an input of a height measurement item included in a UI via at least one of the multiple controllers.

In various embodiments, the electronic device 101 may display a UI 703 based on detection of an input of a height measurement item. The UI 703 may include the text "Please hold the controllers in your both hands and extend your both arms, and then press respective trigger buttons." According to display of the UI 703, as in a user action 707, the user may extend both arms, and may then perform an action of pressing buttons (e.g., trigger buttons) included in the respective controllers which are being held in the user's both hands. Each of the multiple controllers may transmit a signal representing a user input (e.g., an input signal) to the electronic device 101 in response to reception of the user input. The electronic device 101 may determine lengths of the both arms based on the received input signals. For example, the electronic device 101 may identify a position to which the left hand is extended and a position to which the right hand is extended, via the multiple controllers. The electronic device 101 may identify a distance between the left hand and the right hand, and thus may determine lengths of the both arms. In order to determine the user's height, the electronic device 101 may use mathematical formulas (e.g., mathematical formula 1 to mathematical formula 4 included in Table 1) or may use pre-stored information. Various schemes may be used to determine the user's height, and the disclosure is not limited to the above-described example.

The electronic device 101 may store information on the determined user's height. The electronic device 101 may display a UI 705 based on storage of the information on the user's height. The UI 705 may include text representing the information on the user's height. For example, the UI 705 may include the text "130 cm is input as an estimated height." A height measurement operation according to the first configuration of the electronic device 101 may be terminated based on display of the UI 705. The electronic device 101 may terminate the first configuration for display of a UI. According to an embodiment, the electronic device 101 may display the UI 705 based on reception of a user input for configuration, and in this example, the operations of FIG. 7 may be performed repeatedly.

The UI 703 to the UI 705 may include various texts for guiding the actions of measuring the user's height, and the disclosure is not limited to the above-described example.

Figure 8:
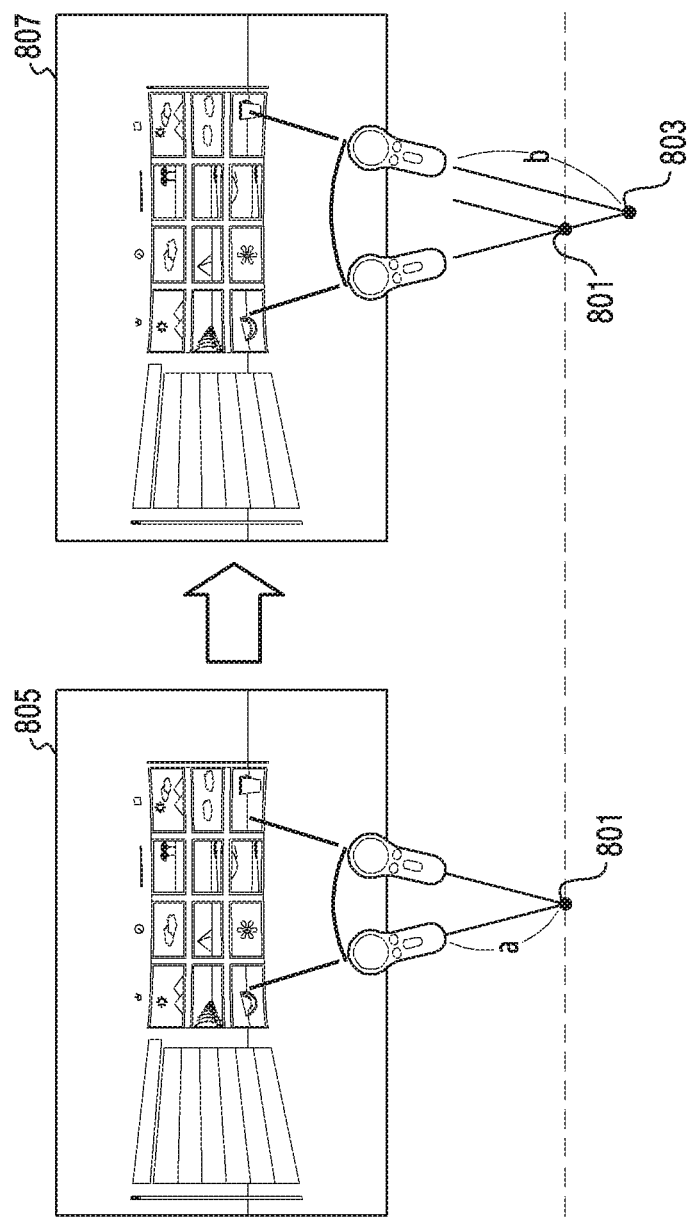
FIG. 8 illustrates an example of configuration of an anchor point for optimization of a UI according to various embodiments.

FIG. 8 illustrates an example of configuration of an anchor point for optimization of a UI according to various embodiments.

Referring to FIG. 8, the electronic device 101 may be connected to the multiple controllers 301. The electronic device 101 may adjust anchor points 801 and 803 for displaying objects representing inputs via the controllers 301 on a UI.

In various embodiments, an anchor point of the electronic device 101 may have a default value. The anchor point may have a default value according to, for example, a default height or a reference-arm span. The default value may include a value of a position of an anchor point. The electronic device 101 may adjust an anchor point based on identifying of a user's characteristic (e.g., the user's height or the user's arm span). The adjusted anchor point may be an anchor point optimized (or adaptively determined) based on the user's characteristic.

In various embodiments, a UI 805 is illustrated as an example of a UI displayed based on a predesignated anchor point 801. The anchor point 801 may be determined to correspond to designation of a as the user's reference-arm span. When the user's arm span is greater than a reference-arm span (or when the user's height is greater than a default height), the electronic device 101 may adjust the anchor point 801. A UI 807 is illustrated as an example of a UI displayed based on the adjusted anchor point 803. When the user's arm span is determined to be b, the UI 807 may include a UI displayed based on adjustment of the anchor point 801. An adjustment range of the controllers 301 may be changed based on the adjustment of the anchor point 801. For example, even when an adjustment angle before a change in an anchor point is identical to an adjustment angle after the change in the anchor point, an object pointed at by each of the controllers may be changed.

In various embodiments, an anchor point may be adjusted according to the user's arm span a or b, and thus the electronic device 101 may optimize the controllers 301 for each user. Optimization makes it possible to enhance the usability with which a user can use the electronic device 101 or the controllers 301.

Figure 9:
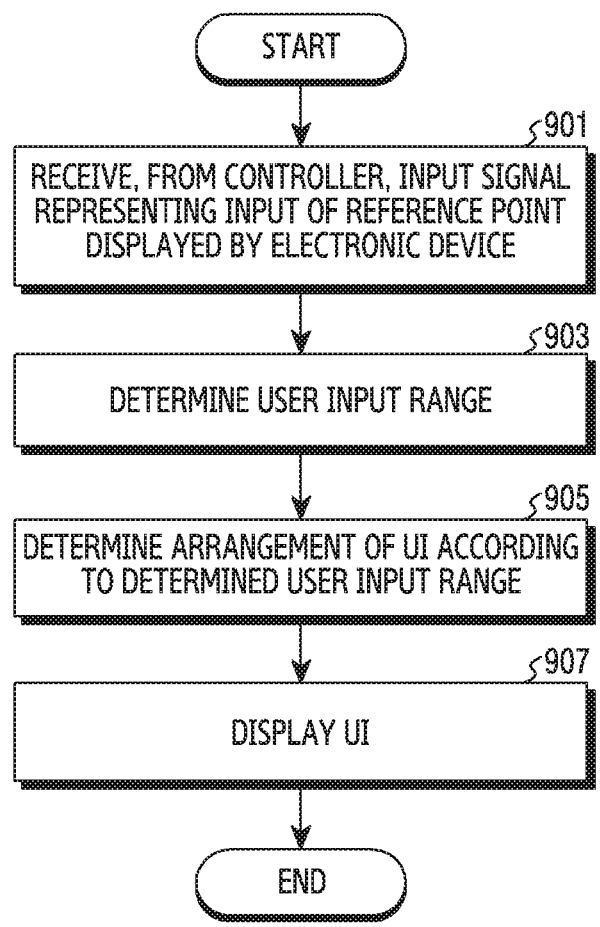
FIG. 9 illustrates another example of an operation of an electronic device for optimizing a UI according to various embodiments.

FIG. 9 illustrates another example of an operation of an electronic device for optimizing a UI according to various embodiments.

Referring to FIG. 9, in operation 901, the electronic device 101 may receive, from the controller 301, an input signal representing an input of a reference point displayed by the electronic device 101. In order to determine a user's characteristic (e.g., a user input range), the electronic device 101 may display one or more reference points in the electronic device 101. The one or more reference points may be, for example, vertices included in any rectangular area in a 3D environment. As another example, the one or more reference points may be multiple reference points representing any circle in a 3D environment. The electronic device 101 may detect a user input of one or more reference points displayed via the controller 301. For example, the electronic device 101 may receive an input signal of the controller via which the user points (or clicks on) one or more reference points.

In various embodiments, the electronic device 101 may measure or acquire data on a user action (or a user movement) of pointing at one or more reference points by using the controller 301. The electronic device 101 may measure or acquire data on a user action (or a user movement) via at least one sensor included in the controller 301 or the electronic device 101. For example, the electronic device 101 may acquire information on a position of the controller in the case of pointing at a reference point.

In operation 903, the electronic device 101 may identify the received input signal, and thus may determine a user input range. The user input range may be determined based on the user's characteristic (e.g., the user's physical characteristic). The user input range may represent a range in which the user can make an input. For example, the user input range may be a range in which the user's arm can be extended. In an embodiment, when an input signal includes information on a position of the controller, the electronic device 101 may identify an area in which the controller can move, and thus may determine a user input range. The user input range may include a range in which a user input can be detected by the controller 301.

In operation 905, the electronic device 101 may determine an arrangement of a UI, according to the determined user input range. In some embodiments, the electronic device 101 may determine an arrangement of a UI so as to display the UI in the determined user input range. In some other embodiments, the electronic device 101 may determine an arrangement of an object included in a UI so as to display the object in the determined user input range. The object may be configured to receive an input. In some embodiments, an object may be executed based on reception of an input. For example, the object may be an icon representing a designated application. The designated application may be executed based on reception of an input of the object. In some other embodiments, objects may include various types of contents, such as images, icons, text, and video. In still some other embodiments, an object may refer to a window including various types of contents.

In operation 907, the electronic device 101 may display a UI. The electronic device 101 may display a UI based on the determined arrangement of the UI or the determined arrangement of the object. In various embodiments, the displayed UI may be a UI optimized for each user. The electronic device 101 can provide a UI of which the convenience, easiness, or usability for a user is enhanced.

Figure 10:
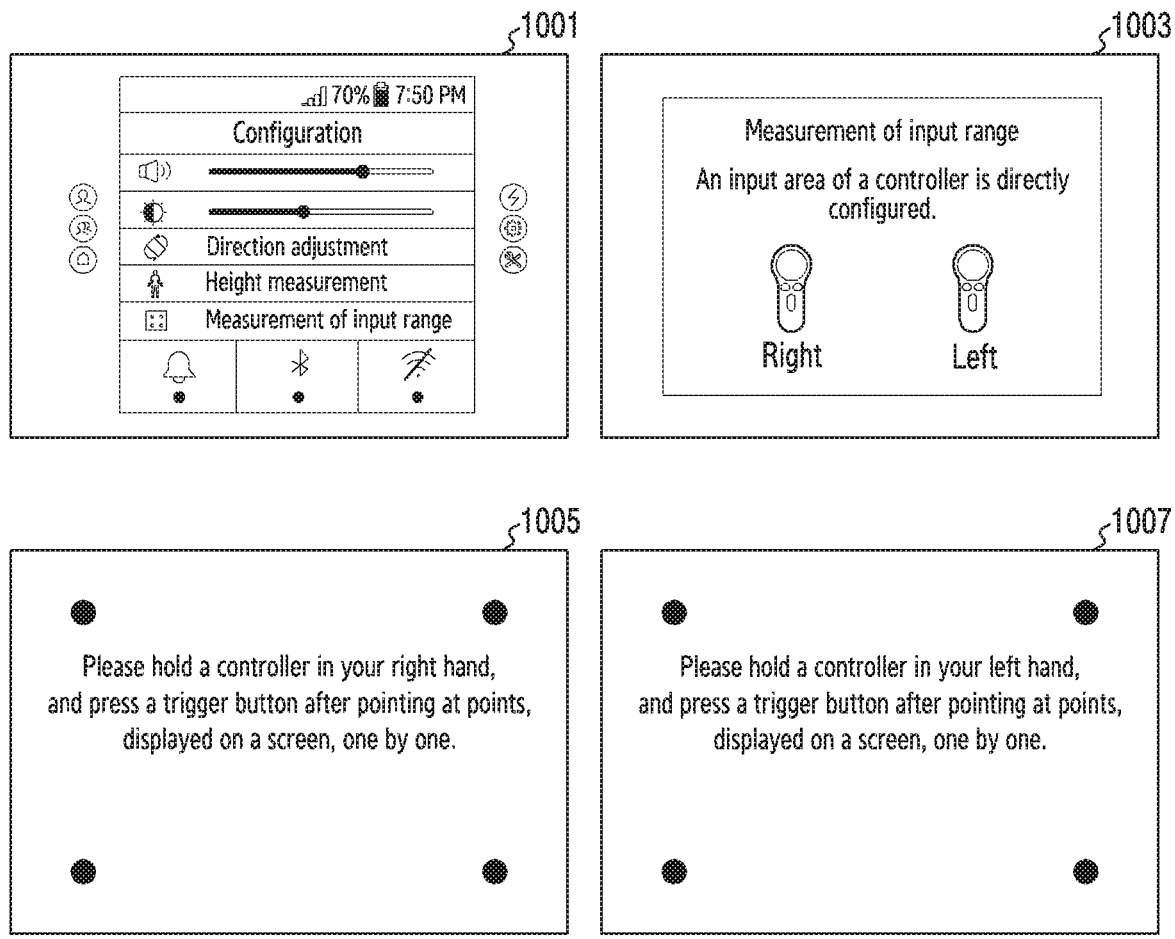
FIG. 10 illustrates another example of a UI configured to determine a user's characteristic according to various embodiments.

FIG. 10 illustrates another example of a UI configured to determine a user's characteristic according to various embodiments.

Referring to FIG. 10, the electronic device 101 is illustrated as an example of a UI configured to determine a user input range. A UI 1001 is illustrated as an example of an initial configuration screen (or an OOBE screen) of the electronic device 101. The UI 1001 may be configured by further including, in the UI 701, an item (or a menu) for measurement of an input range. The electronic device 101 may display a UI 1003 based on detection of an input of an item for measurement of an input range via the controller 301.

The UI 1003 may include text for displaying start of an action of measuring an input range. For example, the UI 1003 may include the text "An input area of the controller is directly configured." In some embodiments, when receiving any input (e.g., an input of pressing any button of the controller) while displaying the UI 1003, the electronic device 101 may display a UI 1005 or a UI 1007.

The UI 1005 may include a UI configured to guide a user input for determination of an input range related to the user's right arm. The UI 1005 may include, for example, the text "Please hold a controller in your right hand, and press a trigger button while pointing at each point displayed on a screen."

In various embodiments, the user may press a trigger button of the controller 301 whenever pointing at each point included in the UI 1005, and thus the controller 301 may transmit an input signal representing a user input to the electronic device 101.

The UI 1007 may include a UI configured to guide a user input for determination of an input range related to the user's left arm. The UI 1007 may include, for example, the text "Please hold a controller in your right hand, and press a trigger button while pointing at each point displayed on a screen."

In various embodiments, the electronic device 101 may include at least one sensor, and may identify a movement range, a movement distance, or movement of the controller 301 via the at least one sensor. The electronic device 101 may determine a user input range represented by a user input signal based on identifying of the same. The user input range may be an area including maximum distances related to positions that the user's hands can reach.

In various embodiments, multiple controllers may be connected to the electronic device 101. When multiple controllers are connected to the electronic device 101, if the UI 1005 is displayed, the electronic device 101 may receive an input via a controller designated for the user's right hand. When the UI 1007 is displayed, the electronic device 101 may receive an input via a controller designated for the user's left hand. The UI 1005 and the UI 1007 may be displayed regardless of the order thereof.

Each of the UI 1003, the UI 1005, and the UI 1007 may include various texts for guiding the actions of measuring a user input range, and the disclosure is not limited to the above-described example.

Figure 11:
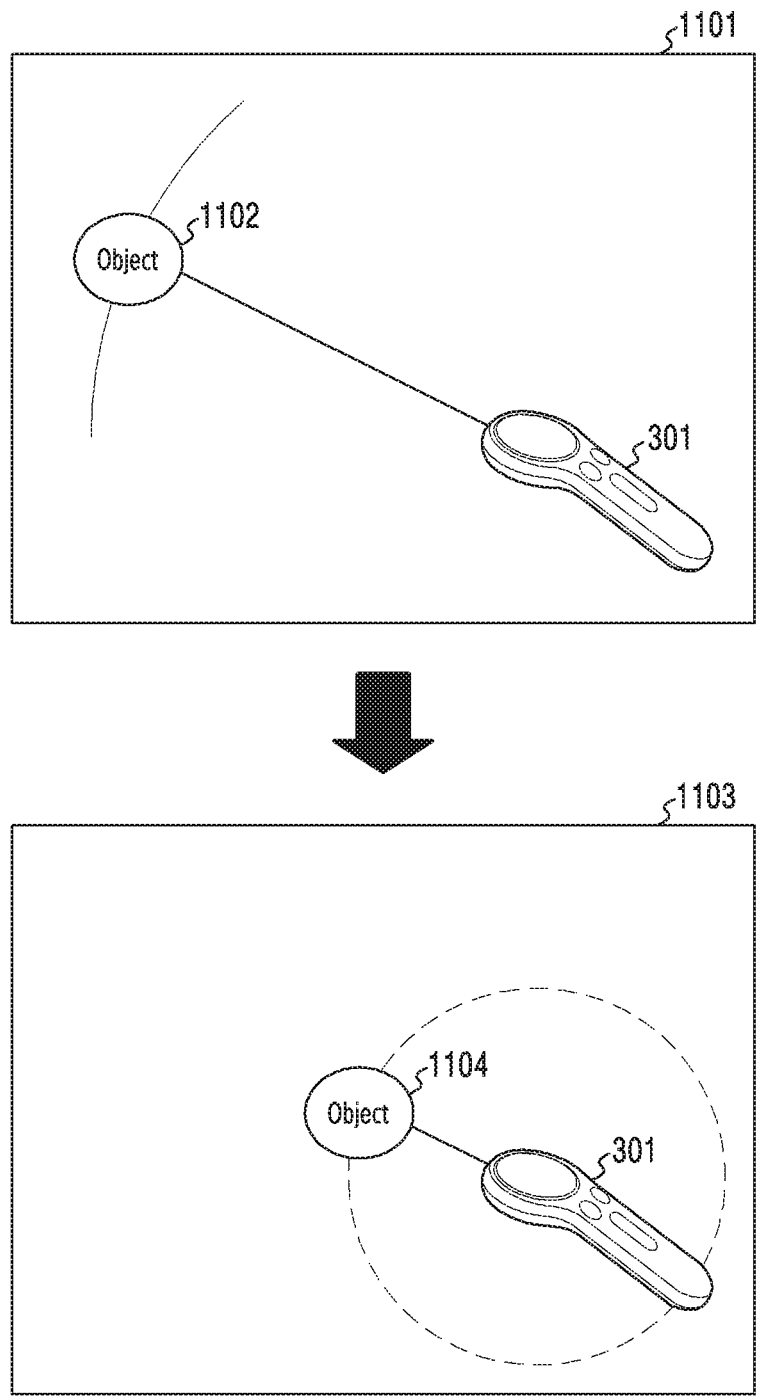
FIG. 11 illustrates an example of a UI optimized according to various embodiments.

FIG. 11 illustrates an example of a UI optimized according to various embodiments.

Referring to FIG. 11, a UI 1101 may include a UI displayed based on a default UI configuration. The UI 1103 may include a UI optimized for a user by an electronic device according to various embodiments.

In various embodiments, the electronic device 101 may include a default configuration for display of a UI. The electronic device 101 may display a UI based on the default configuration. In this example, an object may be displayed at a fixedly-designated position of the electronic device 101.

In various embodiments, the electronic device 101 may change display of a UI via an optimization process. The changed UI may correspond to the UI 1103, and a position of an object having been displayed on the UI 1101 may be changed.

In various embodiments, a UI may be changed based on the user's characteristic. In some embodiments, when the user's height is greater than a default height, the electronic device 101 may arrange an object at a position further away on a central axis. In some other embodiments, when the user's height is less than the default height, the electronic device 101 may arrange an object at a position nearer on the central axis. The height of the user who uses the UI 1103 may be less than the default height. In this example, as in the case of the UI 1103, an object may be arranged at a position nearer on the central axis than in the case of the UI 1101.

In various embodiments, the electronic device 101 may adjust a displayed UI with respect to at least one axis among the x-axis, the y-axis, and the z-axis in a VR environment. For example, when a center point of a display is configured to be (x,y,z)=(0,0,0), an object 1102 of the UI 1101 may be displayed at (x,y,z)=(30,30,30) which is an arbitrary position in a rectangular coordinate system. The electronic device 101 may display an object 1104 of the UI 1103 at (x,y,z)= (10,10,10) based on the user's characteristic. Adjustment allows the user of the electronic device 101 to experience VR in an adjusted area. The adjusted area may be optimized for the user's characteristic (e.g., an arm span or a height).

Figure 12:
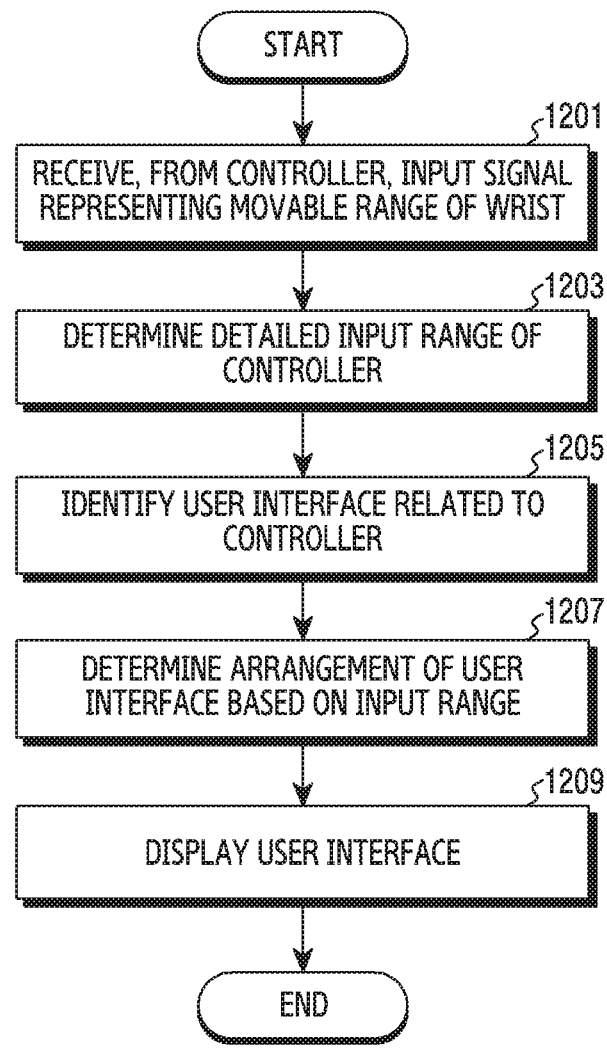
FIG. 12 illustrates an example of an operation of an electronic device for optimizing a UI related to a controller according to various embodiments.

FIG. 12 illustrates an example of an operation of an electronic device for optimizing a UI related to a controller according to various embodiments.

Referring to FIG. 12, in operation 1201, the electronic device 101 may receive, from the controller 301, an input signal representing a movable range of a wrist. The movable range of the wrist may include a range in which the wrist can move in a state in which a position of an arm is fixed. The electronic device 101 may identify movement of the controller 301 based on at least one sensor (e.g., an angular velocity sensor or an acceleration sensor) included in the controller 301.

In operation 1203, the electronic device 101 may determine a detailed input range of the controller 301. The detailed input range of the controller 301 may include a range in which a wrist of a user of the electronic device 101 can move. The electronic device 101 may determine a detailed input range of the controller 301 based on identifying of the movement of the controller 301.

In operation 1205, the electronic device 101 may determine an arrangement of a UI related to the controller 301 based on the detailed input range determined in operation 1203. In order to display a UI related to the controller 301 in the detailed input range, the electronic device 101 may determine an arrangement of the UI related to the controller 301. The UI related to the controller 301 may include, for example, a content, a menu, or the like related to the controller 301. The content or the menu related to the controller 301 may be an object configured to detect an input based on rotation of the controller 301.

In various embodiments, when a UI related to the controller 301 is pre-stored, the electronic device 101 may change an arrangement of the UI related to the controller 301 so that the UI related to the controller 301 can be included in the determined detailed input range. For example, the electronic device 101 may determine that an interval between icons displayed to be spaced apart from each other at intervals of 10 cm is changed to 5 cm in a UI related to the controller 301 so that the UI can be displayed in the detailed input range.

In operation 1207, the electronic device 101 may display a UI based on the determined arrangement of the UI related to the controller 301. When displaying the UI related to the controller 301, the electronic device 101 may display the UI related to the controller 301, based on the determination made in operation 1205.

Figure 13:
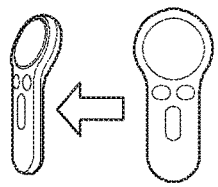
FIG. 13 illustrates an example of a UI configured to determine a user's characteristic related to a controller according to various embodiments.
Figure 13:
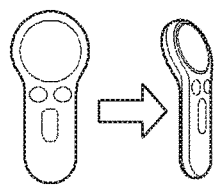
Figure 13:
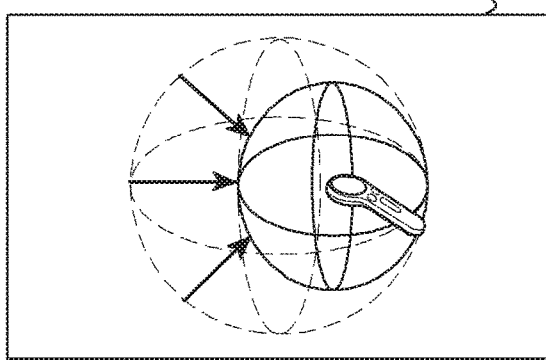
Figure 13:
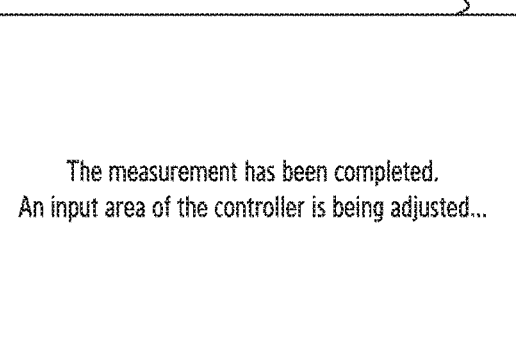

FIG. 13 illustrates an example of a UI configured to determine a user's characteristic related to a controller according to various embodiments.

Referring to FIG. 13, the UI 1301 may include a UI displayed in order to determine a detailed input area of the controller 301. The UI 1301 may be a UI displayed in order to determine a detailed input area of the controller 301 related to a counterclockwise rotation of a left hand. The UI 1301 may include the text for guiding a user action, reading "Please hold a controller in your left hand and extend your left hand forwards. Then, please turn your wrist counterclockwise, and then press a trigger button."

When a user input is received in response to display of the UI 1301, the electronic device 101 may display a UI 1303. The UI 1303 may include a UI displayed in order to determine a detailed input area of the controller 301. The UI 1303 may be a UI displayed in order to determine a detailed input area of the controller 301 related to a clockwise rotation of the left hand. The UI 1303 may include the text for guiding a user action, reading "Please turn your wrist clockwise, and then press a trigger button."

In various embodiments, the electronic device 101 may be connected to multiple controllers. When the electronic device 101 is connected to two controllers, the electronic device 101 may further display a UI configured to determine a detailed input range of a controller for a right hand.

The electronic device 101 may display a UI 1305 based on reception of a user input of a detailed input range of the controller 301. The UI 1305 may include a UI configured to guide completion of measurement for determination of a detailed input range. The UI 1305 may include the text "The measurement is completed. An input area of the controller is being adjusted."

When reference is made to an input range 1307, while the UI 1305 is displayed, the electronic device 101 may adjust a detailed input range related to the controller 301, to an area 1311 from an area 1309. The electronic device 101 may adjust the detailed input range by identifying movement of the controller 301 with reference to a rotation axis of yaw, pitch, or roll of the controller 301. When a movement direction is an x-axis direction, a rotation axis of yaw may be the z-axis (or an axis in a gravity direction), a rotation axis of pitch may be the y-axis, and a rotation axis of roll may be the x-axis. The area 1311 may correspond to the detailed input range determined in the above-described operations. The area 1311 may correspond to the input range optimized based on the movable range of the user's wrist.

In various embodiments, the electronic device 101 may measure an input range of the controller 301, and thus may identify an error range of an input via the controller 301. For example, the area 1311 of the controller 301 may correspond to an error range of an input via the controller 301 relative to a UI of the electronic device 101.

The UI 1301, the UI 1303, and the UI 1305 include various texts for guiding the actions of measuring a movable range of the user's wrist, and the disclosure is not limited to the above-described example.

Figure 14:
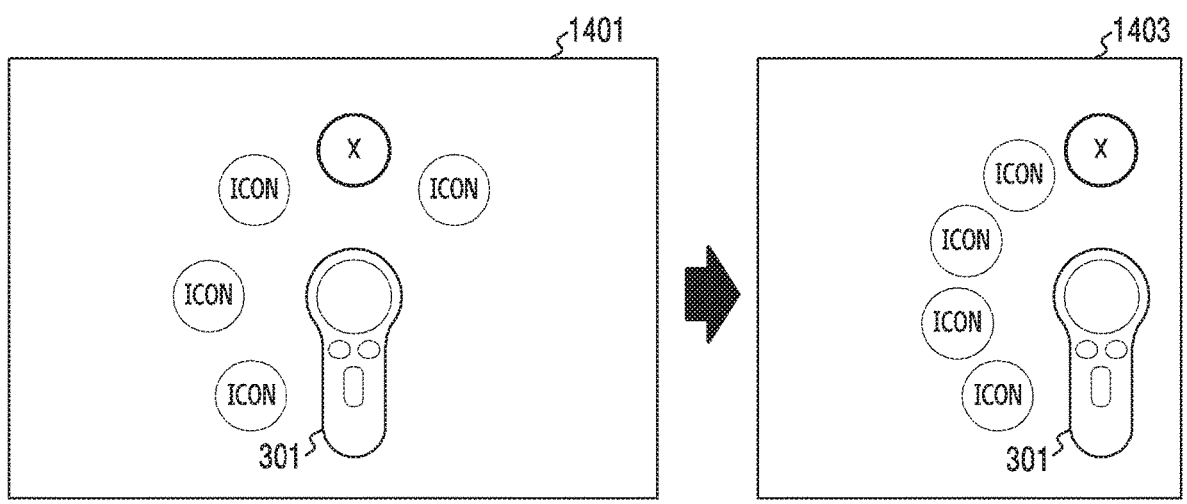
FIG. 14 illustrates an example of a UI which is optimized in relation to a controller according to various embodiments.

FIG. 14 illustrates an example of a UI which is optimized in relation to a controller according to various embodiments.

Referring to FIG. 14, the electronic device 101 may display a UI 1401 related to the controller 301. The UI 1401 may display one or more icons based on movement of the controller 301. Around the one or more icons, a description or the name of each icon may be displayed. One icon 1405 selected from the one or more icons may be emphasized and displayed so that the selection of the same can be represented. In order to emphasize the icon 1405, various methods for displaying the icon 1405 differently from display of the remaining icons may be used, and the disclosure is not limited to the illustrated example.

In various embodiments, various schemes may be used for an input for selecting one icon from one or more icons via the controller 301. For example, the controller 301 may select an icon for a rotational motion which is based on a rotation axis of yaw, pitch, or roll. As another example, the electronic device 101 may select one icon based on detection of a user input via a touch pad included in the controller 301.

In various embodiments, the electronic device 101 may change the UI 1401 to a UI 1403 and display the UI 1403, based on detection of a detailed input range of the controller 301. The UI 1403 may be a UI adjusted (or rearranged) to display one or more icons in the detailed input range.

Although not illustrated, the electronic device 101 may adjust sizes of one or more icons based on detection of a detailed input range of the controller 301, and thus may perform adjustment so as to display the one or more icons in the detailed input range. For example, the electronic device 101 may reduce sizes of one or more icons, and thus may adjust an area for display of the one or more icons.

Figure 15:
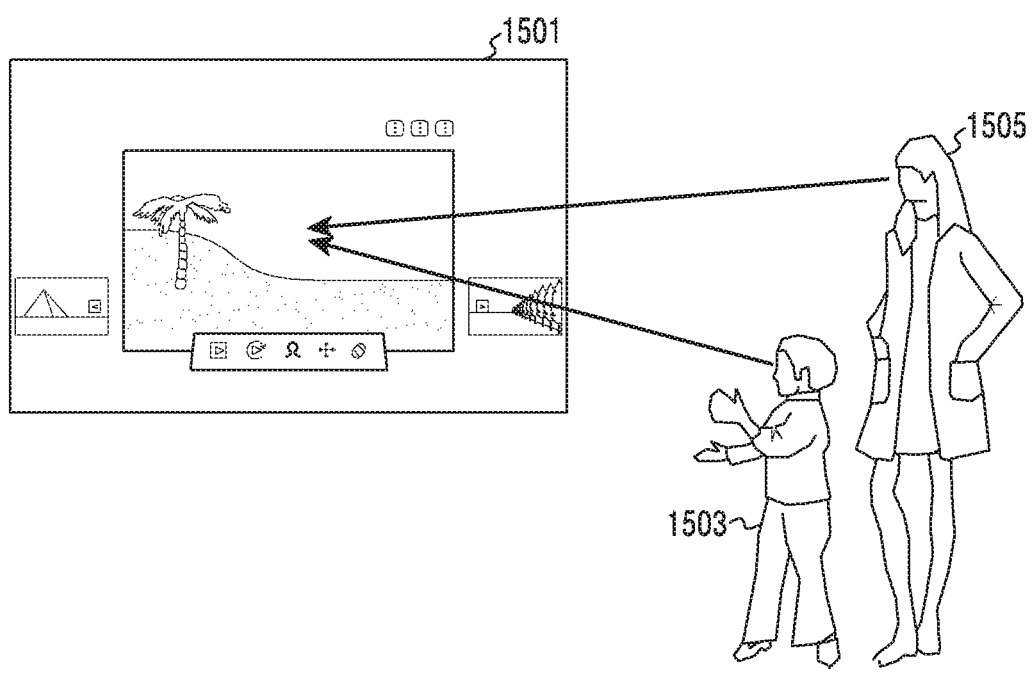
FIG. 15 illustrates an example of a UI displayed according to various embodiments.

FIG. 15 illustrates an example of a UI displayed according to various embodiments. A UI described below may include a UI related to a VR environment.

Referring to FIG. 15, the electronic device 101 may display a UI 1501. The UI 1501 may include one or more objects which are fixedly displayed at a designated position. In various embodiments, forms in which the same UI 1501 is viewed may change according to respective characteristics of users. A short user 1503 (e.g., a child) may recognize a UI in the form of looking up from below. A tall user 1505 (e.g., an adult) may recognize a UI in the form of looking down from above. For example, the user 1503 may recognize the UI, which the user views, as a UI 1601 of FIG. 16, and the user 1505 may recognize the same as a UI 1605 of FIG. 16.

Figure 16:
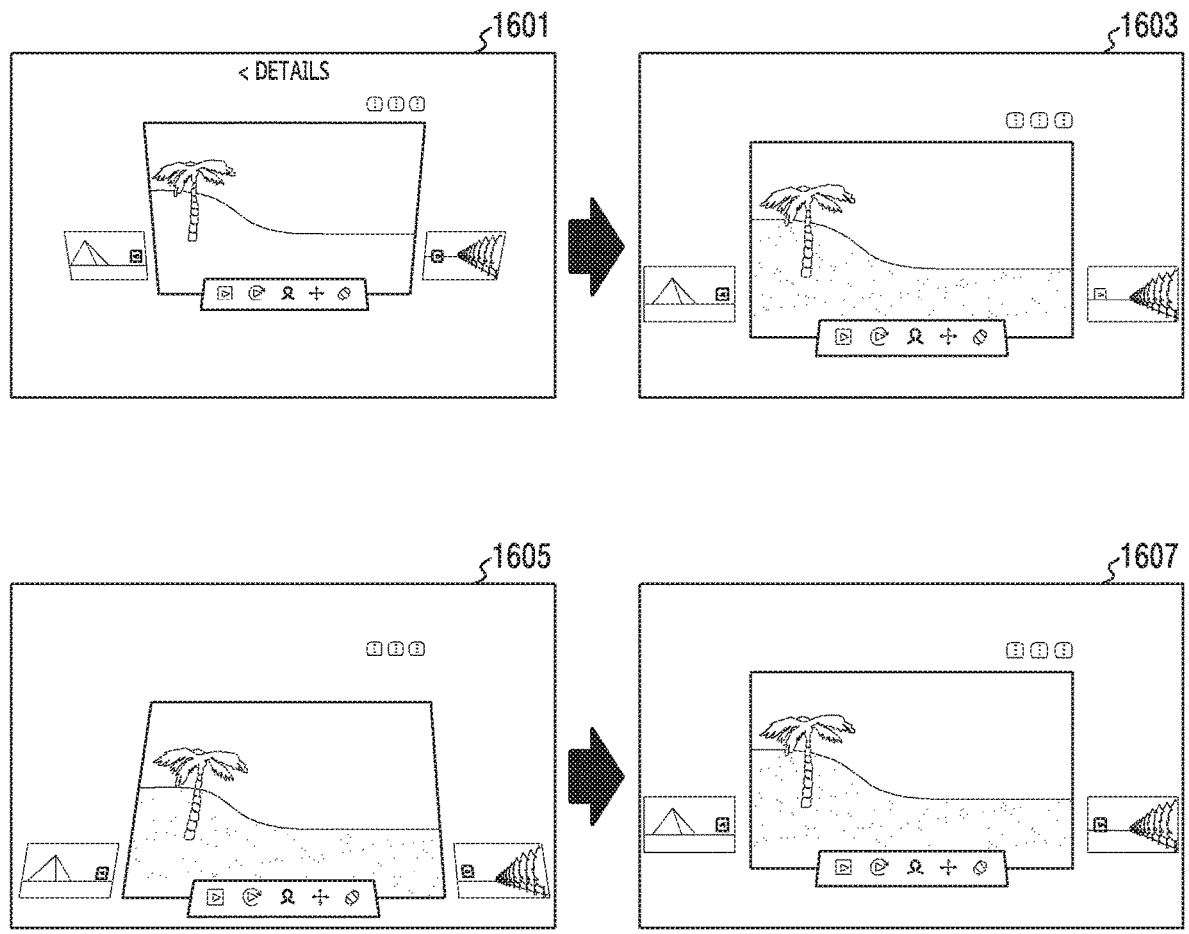
FIG. 16 illustrates an example of a UI displayed in such a manner as to be optimized for a user according to various embodiments.

FIG. 16 illustrates an example of a UI displayed in such a manner as to be optimized for a user according to various embodiments. Each of UIs described below may include a UI related to a VR environment.

In various embodiments, a UI 1601 and a UI 1603 may include a UI that a short user views. The electronic device 101 may adjust display (or FOV) of the UI 1601 based on a characteristic of the short user (e.g., a height, an input range, or a movable range of a wrist). The electronic device 101 may display the UI 1603 based on adjustment of positions at which objects of the UI 1601 are displayed. For example, the electronic device 101 may perform adjustment such that positions, at which objects of the UI 1601 are displayed, are moved downwards by a particular distance and the objects are displayed at the moved positions. Through this configuration, the user of the electronic device 101 may recognize the UI in the form of viewing the UI straight ahead. The UI 1603 may have a form of a UI, which the user views straight ahead, based on the adjustment.

In various embodiments, a UI 1605 and a UI 1607 may include a UI that a tall user views. The electronic device 101 may adjust display (or FOV) of the UI 1605 based on a characteristic of the tall user (e.g., a height, an input range, or a movable range of a wrist). The electronic device 101 may display the UI 1607 based on adjustment of positions at which objects of the UI 1605 are displayed. For example, the electronic device 101 may perform adjustment such that positions, at which objects of the UI 1605 are displayed, are moved upwards by a particular distance and the objects are displayed at the moved positions. Through this configuration, the user of the electronic device 101 may recognize the UI in the form of viewing the UI straight ahead. The UI 1607 may have a form of a UI, which the user views straight ahead, based on the adjustment.

Figure 17:
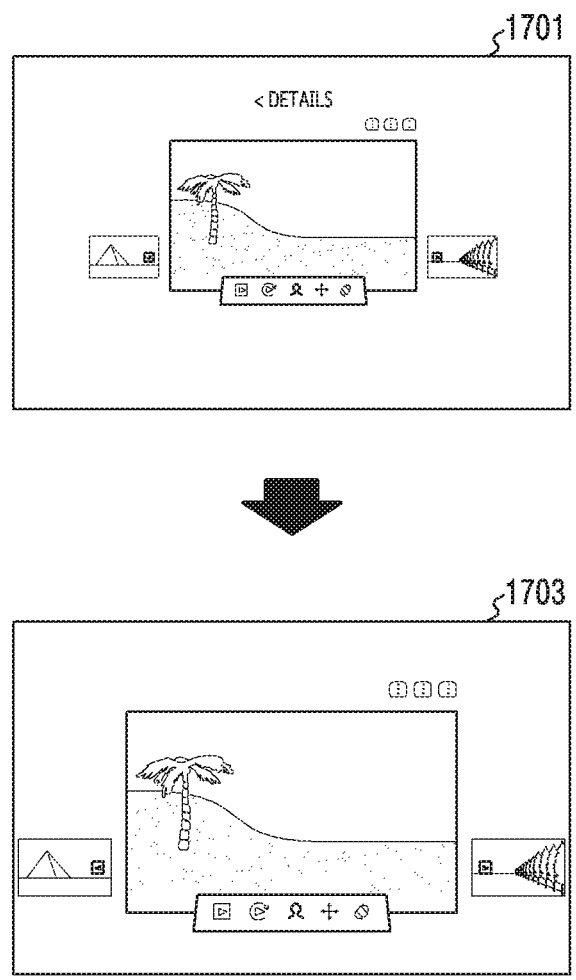
FIG. 17 illustrates another example of a UI displayed in such a manner as to be optimized for a user according to various embodiments.

FIG. 17 illustrates another example of a UI displayed in such a manner as to be optimized for a user according to various embodiments.

Referring to FIG. 17, the electronic device 101 may adjust a UI 1701, displayed at a distant position, so that the UI 1701 can be displayed at a close-range position, based on a user's characteristic. The electronic device 101 may adjust an arrangement of the UI 1701 or an arrangement of objects included in the UI 1701, and thus may display a UI 1703. Objects of the UI 1703 may be displayed to have larger sizes than those of the UI 1701.

In various embodiments, FIG. 17 may illustrate a UI in a VR environment. In this configuration, FIG. 17 may illustrate an example related to one of a user's two eyes. The electronic device 101 may further display a UI which corresponds to the UI 1701 and is related to a view position (or a view direction) of the other eye of the user. For example, the electronic device 101 may display a UI related to a view position of the left eye and a UI related to a view position of the right eye. In some embodiments, the electronic device 101 may provide, via an application for providing VR, a UI related to each of a view position of the left eye and a view position of the right eye. The electronic device 101 may include a screen of another application (e.g., a photograph application or a game application) in a 3D screen so as to be rendered, by using an application for providing VR.

Figure 18:
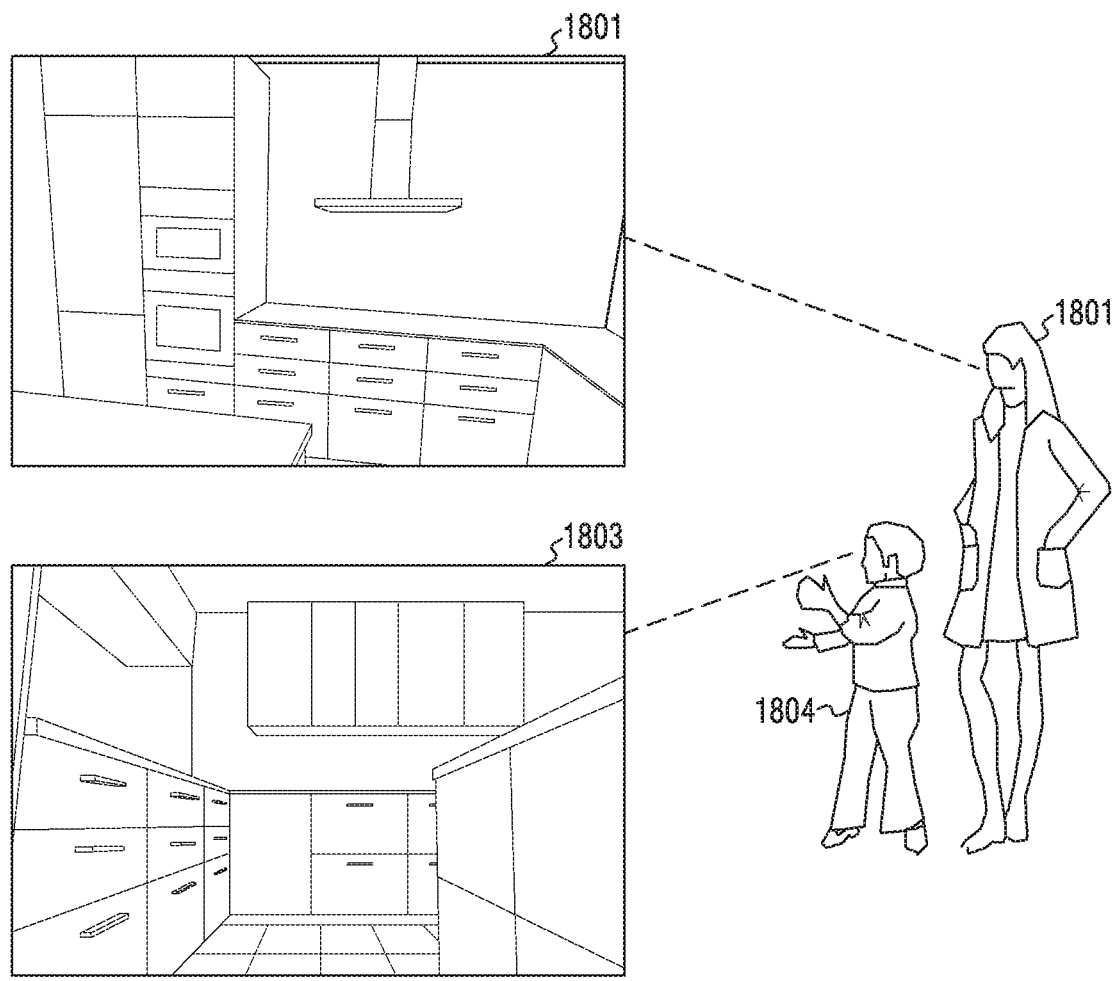
FIG. 18 illustrates still another example of a UI displayed according to various embodiments.

FIG. 18 illustrates still another example of a UI displayed according to various embodiments.

Referring to FIG. 18, the electronic device 101 may include an application which needs provision of various FOVs in relation to a particular space. For example, the electronic device 101 may include an interior application for representing how an interior design has been applied to a house. As another example, the electronic device 101 may include a shopping application. The electronic device 101 may provide, via the shopping application, a UI obtained by applying furniture, desired to be purchased by a user, to a structure or interior of the user's house. Since it is possible to provide the user with information based on FOVs different according to users' heights, the electronic device 101 may provide a UI (or FOV) corresponding to the user's height.

In various embodiments, the electronic device 101 may identify whether an executed application is an application which requires FOVs different according to users. If the executed application requires FOVs different according to users, the electronic device 101 may identify the predetermined user's characteristic (e.g., the user's height or the user's arm span) or may perform at least one operation (e.g., the operations of FIG. 4) of determining the user's characteristic. The electronic device 101 may adjust display of a UI based on the user's characteristic. For example, when the user is a tall user 1801, the electronic device 101 may provide the user with a UI (or FOV) 1801 in the form of looking down from above. As another example, when the user is a short user 1804, the electronic device 101 may provide the user with a UI (or FOV) 1803 in the form of looking up from below. The UIs described above with reference to FIG. 18 may be UIs which can be displayed in a VR environment.

Figure 19:
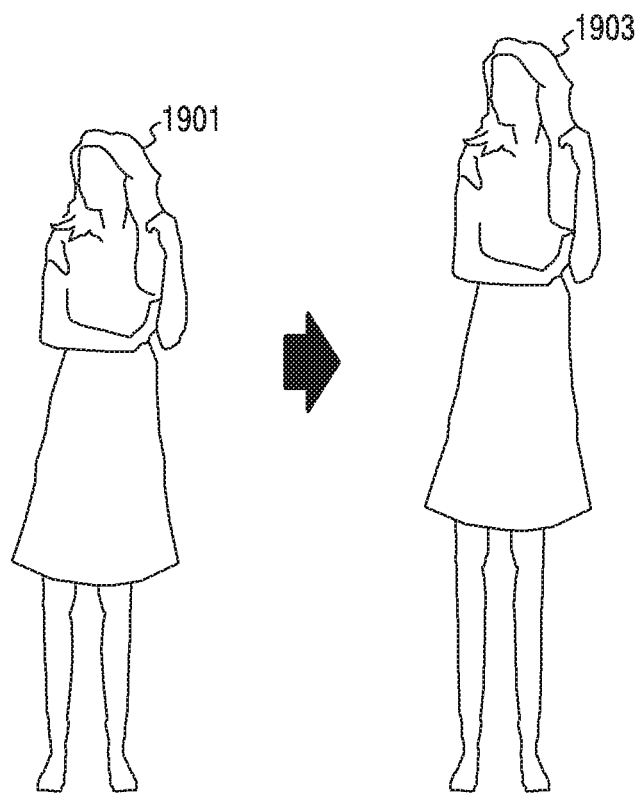
FIG. 19 illustrates an example of an object displayed based on a user's characteristic according to various embodiments.

FIG. 19 illustrates an example of an object displayed based on a user's characteristic according to various embodiments.

Referring to FIG. 19, the electronic device 101 may generate a character representing a user based on execution of a character application (or an avatar application). In relation to the character application, the electronic device 101 may pre-store information on a basic character 1901. The electronic device 101 may identify the user's characteristic based on execution of the character application. In some embodiments, when information on the user's characteristic is stored, the electronic device 101 may identify the user's characteristic based on the stored information. In some other embodiments, when information on the user's characteristic is not stored, the electronic device 101 may perform at least one operation (e.g., the operations of FIG. 4) of determining the user's characteristic based on execution of a character application.

In various embodiments, the electronic device 101 may change a size and the like of the basic character 1901 based on the user's characteristic. For example, the electronic device 101 may compare information on a height of the basic character 1901 with information on the user's height, and thus may generate a character 1903 reflecting the user's characteristic. As another example, the electronic device 101 may compare information on the height of the basic character 1901 with information on the user's height, and thus may change the basic character 1901 to the character 1903 reflecting the user's characteristic.

In various embodiments, the characters described above with reference to FIG. 19 may be VR objects (or 3D objects) which can be displayed in a VR environment. The characters are illustrated as an example in FIG. 19, but various contents, objects, icons, or the like may also be rearranged, reconfigured, or readjusted based on the user's characteristic.

In various embodiments, the electronic device 101 may store the user's information in an application for health care (e.g., a health application) based on the user's characteristic. The electronic device 101 may measure information on a numerical value affected by the height based on the stored information. For example, the numerical value affected by the height may be calories consumed by the user or a standard weight. In some embodiments, the electronic device 101 may determine the user's stride based on information on the user's height. The electronic device 101 may determine calories, consumed by the user, based on the determined user's stride. Calories consumed by the user may be determined based on the user's stride and the user's step count. In some other embodiments, the electronic device 101 may determine a standard weight based on information on the user's height. For example, the electronic device 101 may determine that a standard weight is a value obtained by multiplying a value, obtained by subtracting 100 from the height, by 0.9.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a memory storing instructions;
a communication interface; and
at least one processor connected to the communication interface and the memory,
wherein the at least one processor is configured to:
in response to a user input to an external electronic device, receive at least one signal transmitted by the external electronic device, wherein the at least one signal comprises a first signal and a second signal,
identify a distance between a position at which the first signal is received and a position at which the second signal is received,
based on the identified distance, determine a physical characteristic of a user, the physical characteristic being related to the electronic device and the external electronic device;
based on the at least one signal and the physical characteristic of the user, determine a field of view (FOV) for the user, and
based on the determined FOV, execute the stored instructions to display content for virtual reality (VR).

2. The electronic device of claim 1, wherein the at least one processor is further configured to execute the stored instructions to determine that the physical characteristic of the user is a value which is pre-stored after being mapped to information on the identified distance.

3. The electronic device of claim 1, wherein the physical characteristic of the user comprises at least one of a height of the user, an arm span of the user, a width of both arms of the user, a user input range, or a movable range of a wrist of the user.

4. The electronic device of claim 1,
wherein the at least one processor is further configured to, based on the at least one signal, execute the stored instructions to determine an anchor point according to the user input related to the external electronic device, and
wherein the anchor point corresponds to a reference point for control of an input for the content received from the external electronic device.

5. The electronic device of claim 1,
wherein the at least one signal corresponds to a signal representing an input for pointing to at least one object displayed in a user interface of the electronic device, and
wherein the at least one processor is further configured to:
determine a user input range based on the input for pointing to the at least one object, and
execute the stored instructions to display the content in the user input range.

6. The electronic device of claim 1,
wherein the at least one signal comprises a signal representing a rotation of the external electronic device, and
wherein the at least one processor is further configured to:
based on the at least one signal, determine a detailed input range, and
based on the detailed input range, execute the stored instructions to display, in a user interface of the electronic device, content related to the external electronic device.

7. A method of an electronic device, the method comprising:
in response to a user input to an external electronic device, receiving at least one signal transmitted by the external electronic device, wherein the at least one signal comprises a first signal and a second signal;
identifying a distance between a position at which the first signal is received and a position at which the second signal is received;
based on the identified distance, determining a physical characteristic of a user, the physical characteristic being related to the electronic device and the external electronic device;
based on the at least one signal and the physical characteristic of the user, determining a field of view (FOV) for the user; and
based on the determined FOV, displaying content for virtual reality (VR).

8. The method of claim 7, further comprising determining that the physical characteristic of the user is a value which is pre-stored after being mapped to information on the identified distance.

9. The method of claim 7, wherein the physical characteristic of the user comprises at least one of a height of the user, an arm span of the user, a width of both arms of the user, a user input range, or a movable range of a wrist of the user.

10. The method of claim 7, further comprising:
based on the at least one signal, determining an anchor point according to the user input related to the external electronic device,
wherein the anchor point corresponds to a reference point for control of an input for the content received from the external electronic device.

11. The method of claim 7,
wherein the at least one signal corresponds to a signal representing an input for pointing to at least one object displayed in a user interface of the electronic device, and
wherein the method further comprises:
determining a user input range based on the input for pointing to the at least one object; and
displaying the content in the user input range.

12. The method of claim 7,
wherein the at least one signal comprises a signal representing a rotation of the external electronic device, and
wherein the method further comprises:
based on the at least one signal, determining a detailed input range; and
based on the detailed input range, displaying content related to the external electronic device in a user interface of the electronic device.

13. A non-transitory computer-readable storage medium comprising:
in response to a user input to an external electronic device, receiving at least one signal transmitted by the external electronic device, wherein the at least one signal comprises a first signal and a second signal;
identifying a distance between a position at which the first signal is received and a position at which the second signal is received;
based on the identified distance, determining a physical characteristic of a user, the physical characteristic being related to an electronic device and the external electronic device;
based on the at least one signal and the physical characteristic of the user, determining a field of view (FOV) for the user; and
based on the determined FOV, displaying content for virtual reality (VR).

* * * * *